US006759824B2

United States Patent
Kawabata et al.

(10) Patent No.: US 6,759,824 B2
(45) Date of Patent: Jul. 6, 2004

(54) MOTOR CONTROLLER AND METHOD OF DRIVING DC MOTOR

(75) Inventors: Toru Kawabata, Neyagawa (JP); Yoshihiro Mushika, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 39 days.

(21) Appl. No.: 10/195,086

(22) Filed: Jul. 12, 2002

(65) Prior Publication Data

US 2003/0011333 A1 Jan. 16, 2003

(30) Foreign Application Priority Data

Jul. 13, 2001 (JP) ........................................ 2001-213381

(51) Int. Cl.[7] .............................................. G11B 23/00
(52) U.S. Cl. ........................................ 318/436; 318/500
(58) Field of Search .................................. 318/436, 500, 318/159

(56) References Cited

U.S. PATENT DOCUMENTS 3,839,664 A * 10/1974 Dirks et al. ............. 360/78.12
3,854,080 A * 12/1974 Bambara et al. ............. 318/436
3,893,012 A * 7/1975 Lin ............................. 318/696
4,739,239 A * 4/1988 Krause et al. ............... 318/685
5,189,355 A * 2/1993 Larkins et al. .............. 318/685

FOREIGN PATENT DOCUMENTS

JP        2000-20974 A        1/2000

* cited by examiner

*Primary Examiner*—Bentsu Ro
(74) *Attorney, Agent, or Firm*—Akin Gump Strauss Hauer & Feld, L.L.P.

(57) ABSTRACT

A motor controller includes DC motor, driving mechanism, voltage generator circuit and control unit. The driving mechanism moves an object having a predetermined mass against a load applied to the object and by transmitting a rotational force of the motor to the object. The voltage generator circuit generates first and second voltages. The first voltage is high enough to rotate the motor to such a degree as to get the object moved by the driving mechanism. The second voltage has the same polarity as the first voltage and has such amplitude as to prevent the motor from rotating either in a backward direction due to a cogging torque or in a forward direction. The control unit controls the voltage generator circuit in such a manner that the voltage generator circuit applies the second voltage to the motor after having applied the first voltage to the motor.

14 Claims, 10 Drawing Sheets

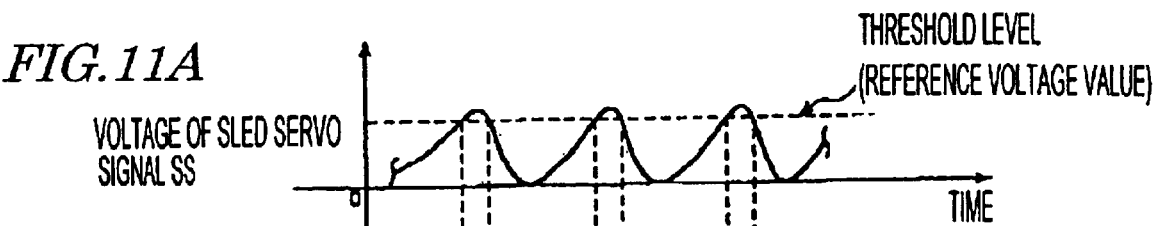
*FIG.11A* VOLTAGE OF SLED SERVO SIGNAL SS — THRESHOLD LEVEL (REFERENCE VOLTAGE VALUE)
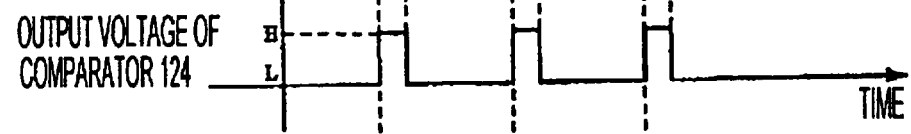
*FIG.11B* OUTPUT VOLTAGE OF COMPARATOR 124
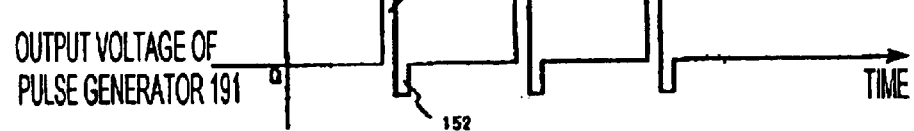
*FIG.11C* OUTPUT VOLTAGE OF PULSE GENERATOR 191
PRIOR ART
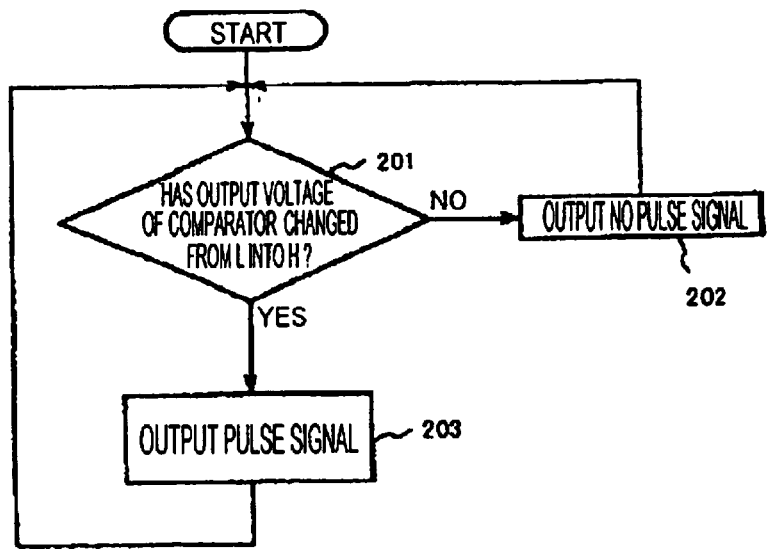
*FIG.12*
PRIOR ART

MOTOR CONTROLLER AND METHOD OF DRIVING DC MOTOR

BACKGROUND OF THE INVENTION

1. Field of the Invention

The present invention generally relates to a motor controller and more particularly relates to an apparatus for performing an accurate positioning control by using a DC motor of a small size and a method of driving a DC motor.

2. Description of the Related Art

A DC motor including a brush and a commutator has a simple structure and can be manufactured at a low cost. Also, a DC motor achieves high efficiency and high output although its size is small, and needs no special driver. For these reasons, a DC motor is now used in numerous appliances.

However, if it is necessary to control the stop angle of the rotor of a DC motor accurately enough or to rotate the motor at an extremely low number of revolutions per minute, it might be difficult for a DC motor to satisfy these requirements fully.

This is partly because a DC motor generates a cogging torque. Hereinafter, the cogging torque of a DC motor will be described.

As shown in FIG. 8A, a DC motor includes a rotor 94 and fields 95. The rotor 94 includes magnetic poles 91, 92 and 93, each of which includes an iron core made of a magnetic material such as silicon steel and a coil that is wound around the iron core. Each of the fields 95 is a permanent magnet such as a ferrite magnet. The DC motor typically has three magnetic poles 91, 92 and 93 and two fields 95 as shown in FIG. 8A.

In a DC motor like this, the magnetic poles 91, 92 and 93, including magnetic bodies, are attracted to the fields 95. Accordingly, even when no electrical power is applied to the DC motor, a torque is generated in such a direction as to rotate the rotor 94. The torque rotates the rotor 94 so that the magnetic poles 91, 92 and 93 are stabilized in the magnetic field that has been generated by the fields 95. The torque that is going to rotate the rotor 94 is generated by the attraction between the magnetic poles 91, 92 and 93 and the fields 95. Thus, the angle of rotation of the rotor 94 at which the magnetic poles 91, 92 and 93 are stabilized changes with the positional relationship between the fields 95 and the magnetic poles 91, 92 and 93.

The "stabilized state" normally refers to a state in which one of the magnetic poles 91, 92 and 93 is closest to one of the fields 95. For example, FIG. 8A illustrates one of those stabilized states in which the magnetic pole 91 is closest to the N pole field 95. In such a state, there is no torque that is going to rotate the rotor 94.

Suppose the rotor 94 is rotated clockwise from the position shown in FIG. 8A. In that case, when the rotor 94 is rotated 60 degrees from the position shown in FIG. 8A, the magnetic pole 92 will be closest to the S pole field 95 as shown in FIG. 8B. This is another stabilized state. Since the rotor 94 has the three magnetic poles 91, 92 and 93 and the number of the fields 95 is two, there will be six stabilized states for one rotation of the rotor 94. That is to say, every time the rotor 94 rotates 60 degrees, one of the six stabilized states appears.

FIG. 9 shows the magnitudes and directions of the torques that are generated by the magnetic attraction between the rotor 94 and the fields 95. In FIG. 9, the state shown in FIG. 8A is regarded as an initial state. If a force is externally applied to the rotor 94 to rotate the rotor 94 clockwise from the initial state as indicated by the point A in FIG. 9 with no electrical power applied to the DC motor, the attraction between the N pole field 95 and the magnetic pole 91 generates a torque in the direction opposite to the rotational direction. As the angle of rotation increases, this reverse torque increases its magnitude. And when the rotor 94 rotates approximately 15 degrees, the magnitude of the reverse torque is maximized as indicated by the point B in FIG. 9. As the rotor 94 is further rotated, attraction is soon generated between the magnetic pole 92 and the S pole field 95. Accordingly, the reverse torque applied to the rotor 94 decreases gradually. And when the rotor 94 rotates approximately 30 degrees, no reverse torque is applied to the rotor 94 anymore as indicated by the point C in FIG. 9.

As the rotor 94 is further rotated, the attraction between the magnetic pole 92 and the S pole field 95 dominates, thereby generating a torque that rotates the rotor 94 clockwise. When the rotor 94 rotates approximately 45 degrees, the torque that rotates the rotor 94 clockwise is maximized as indicated by the point D in FIG. 9. But that torque also decreases as the rotor 94 is further rotated. And when the rotor 94 rotates approximately 60 degrees, no torque that rotates the rotor 94 clockwise is applied to the rotor 94 anymore as indicated by the point E in FIG. 9.

Actually, though, a friction torque is applied to the shaft of the rotor 94 as indicated by the one-dot chains in FIG. 9. Accordingly, unless a torque that has a magnitude greater than that of the friction torque is generated and applied to the rotor 94, the rotor 94 never rotates. Thus, the effective torque applied to the rotor 94 is indicated by the solid curve in FIG. 9. As can be seen from FIG. 9, such a torque variation is repeatedly caused every time the rotor 94 rotates 60 degrees. As indicated by the solid curve in FIG. 9, the effective torque may be positive, negative or zero depending on the angle of rotation of the rotor 94. This effective torque is the so-called "cogging torque".

If the DC motor is stopped by discontinuing the supply of power to the DC motor, the magnitude and the direction of the cogging torque change with the stop angle of the rotor 94. Accordingly, when the rotor 94 reaches such an angle as to generate zero cogging torque (e.g., approximately 30 degrees or approximately 60 degrees in the example shown in FIG. 9), the rotor 94 can be stopped without being affected by the cogging torque.

However, if the rotor 94 should be stopped at such an angle as to generate a positive cogging torque, then that cogging torque is applied to the rotor 94, thereby rotating the rotor 94 excessively (i.e., to an angle greater than the desired angle) until the rotor 94 is stabilized. In the example shown in FIG. 9, the rotor 94 is rotated unintentionally to around 60 degrees, around 120 degrees, etc. On the other hand, if the rotor 94 should be stopped at such an angle as to generate a negative cogging torque, then a cogging torque is generated and applied to the rotor 94 in such a direction as to rotate the rotor 94 in the backward direction. In that case, just before the rotor 94 stops rotating, the rotor 94 rotates in the backward direction until the rotor 94 is stabilized. In the example shown in FIG. 9, the rotor 94 retrogrades to around 0 degrees, around 60 degrees, etc. For these reasons, when a DC motor is used, it is difficult to control the stop angle of the rotor 94 accurately enough.

Furthermore, a non-uniform torque is generated around the shaft of a DC motor when power is supplied to the DC motor. A DC motor of a small size, in particular, has a small number of magnetic poles, and therefore, there is a significant variation in the torque generated during one rotation of the rotor 94. The output of a DC motor is also affected by a variation in the power supplied to the DC motor to drive it or in the load connected to the motor. Consequently, there is a great variation in the output of the DC motor.

In addition, there is also a great variation in the load applied to a DC motor (e.g., friction caused at the bearing thereof). In particular, a load variation resulting from the difference between static friction and kinetic friction is a problem. More specifically, when power is supplied to a DC motor, the static friction caused at the bearing increases proportionally to the torque generated at the rotor 94. However, once the rotor 94 has started to rotate, the static friction changes into kinetic friction. Accordingly, the friction that interferes with the rotation of the rotor 94 decreases steeply. Such a variation in friction may be regarded as a sort of negative resistance. Thus, in performing a proportional control on a DC motor, such a variation introduces instability into the system. Consequently, it is particularly difficult to rotate the motor stably at a low velocity.

The rotor has a great moment of inertia, which poses another serious problem. In a DC motor of a small size, permanent magnets are used as its fields to cut down the space for the fields, and a rotor having a relatively large diameter may be used by making use of the extra space. In this manner, a high-efficiency and high-output motor is achievable. However, the larger the diameter of the rotor, the greater moment of inertia the rotor has. The equivalent mass of the moment of inertia of a rotor is changeable with the type of the load to be driven by a DC motor, but typically several times as great as the mass of the load to be driven by the DC motor.

As the moment of inertia of a rotor increases, it takes a longer and longer time to start or stop a DC motor. Accordingly, the load being driven by the DC motor cannot move so quickly for a while after the DC motor has been started. Likewise, it is also difficult for the DC motor to stop the load the instant the power that has been supplied to the DC motor is stopped.

These problems may be solved if the velocity of the load being driven by the DC motor is detected to position the load accurately. However, when such a control mechanism is added to detect the velocity of the load, the cost of a DC motor controller increases. Accordingly, a velocity detecting mechanism like that cannot be added to an apparatus that should be manufactured at a low cost.

Examples of controllers using a DC motor include an optical disk drive. For example, Japanese Laid-Open Publication No. 2000-20974 discloses a technique of pulse-driving a DC motor in an optical disk drive. An optical disk drive needs to move an optical head (i.e., the object of control) to a target location at a high speed and position the head accurately. Hereinafter, the conventional optical disk drive disclosed in Japanese Laid-Open Publication No. 2000-20974 will be described.

FIG. 10A is a block diagram illustrating the main section of an optical disk drive 101 that uses the conventional motor controller, while FIG. 10B is a plan view thereof. The optical disk drive 101 is a CD-ROM drive for use to read an optical disk (i.e., a CD-ROM in this case) 102, on which spiral tracks are formed. The optical disk drive 101 includes optical head (optical pickup) 103, optical head moving mechanism (see FIG. 10B), control unit 109, tracking error signal generator 121, tracking servo circuit 122, sled servo circuit 123 and comparator 124. The optical head 103 can be moved by the optical head moving mechanism in the radial direction of the optical disk 102 mounted (i.e., the direction indicated by the arrow A in FIG. 10B). The radial direction of the optical disk 102 will be herein simply referred to as a "radial direction".

The optical head 103 includes an objective lens (or condenser lens) 132 and a tracking actuator 141. The objective lens 132 is movable both in the radial direction and in a direction parallel to the axis of rotation of the optical disk 102 (which direction will be herein simply referred to as a "rotation axis direction"). The tracking actuator 141 moves the objective lens 132 in the radial direction (i.e., toward the inner periphery or the outer periphery of the optical disk 102). When a predetermined voltage is applied to the tracking actuator 141 by way of a driver 142, the tracking actuator 141 moves the objective lens 132 in the radial direction in accordance with the polarity and amplitude of the voltage.

The optical head moving mechanism includes sled motor (or feed motor) 107, driver 171 for driving the sled motor 107, lead screw (worm gear) 181 secured to the shaft 108 of the sled motor 107, worm wheel 241, pinion gear 242, rack gear 115 and a pair of guide shafts 116 for guiding the optical head 103 thereon. The optical head 103 is supported by the guide shafts 116 so as to be movable on the shafts 116. When the sled motor 107 is started by a driving control technique to be described later, the optical head 103 starts to move on the guide shafts 116 in a predetermined direction.

The control unit 109 is normally a microprocessor (or CPU) to perform an overall control on the optical head 103, sled motor 107, tracking servo circuit 122, sled servo circuit 123 and other components of the optical disk drive 101. This control unit 109 includes a pulse generator (or pulse voltage generator) 191. The control unit 109 and the comparator 124 together make up a shift detector for detecting the shift of the objective lens 132.

In this optical disk drive 101, the output voltage signal of the optical head 103 is input to the tracking error signal generator 121, which generates a tracking error signal TE as a voltage signal. The tracking error signal TE is input to the tracking servo circuit 122, thereby generating a tracking servo signal TS as another voltage signal. The level (or the voltage value) of this tracking servo signal TS represents the magnitude and direction of the shift of the objective lens 132 from its home position in the radial direction.

The tracking servo signal TS is input not only to the tracking actuator 141 by way of the driver 142 but also to the sled servo circuit 123. In response to the tracking servo signal TS, the tracking actuator 141 is driven so as to move the objective lens 132 toward the center of the target track. That is to say, a tracking servo control is performed.

However, it is still difficult for the objective lens 132 to follow the track accurately just by driving this tracking actuator 141. For that reason, the sled motor 107 is also driven to move the optical head 103 itself in the direction in which the objective lens 132 has moved. In this manner, a sled control is carried out so as to move the objective lens 132 back to its home position.

In response to the tracking servo signal TS, the sled servo circuit 123 generates a sled servo signal SS. The level (or the voltage value) of this sled servo signal SS represents the magnitude and direction of the shift of the objective lens 132 from its home position in the radial direction. The sled servo signal SS is input to the comparator 124, which digitizes the signal SS. Then, the output digital signal (or voltage) of the comparator 124 is input to the control unit 109.

FIGS. 11A, 11B and 11C are timing diagrams showing the respective waveforms of the sled servo signal (or voltage) SS, the output signal (or voltage) of the comparator 124 and the output signal (or voltage) of the pulse generator 191 in the optical disk drive 101 that uses the conventional motor controller. FIG. 12 is a flowchart showing how the control unit 109 performs the sled control operation.

As shown in FIGS. 11A and 11B, if the sled servo signal SS has a level (or voltage value) equal to or higher than a threshold level (i.e., a reference voltage value), the output signal of the comparator 124 is high (H). On the other hand, if the sled servo signal SS has a level (or voltage value) lower than the threshold level (i.e., the reference voltage value), the output signal of the comparator 124 is low (L).

In the optical disk drive 101, when the output signal of the comparator 124 rises from the L level to the H level, the shift of the objective lens 132 from its home position is regarded as having reached a certain limit. Then, the pulse generator 191 of the control unit 109 generates and outputs a pulse signal (or pulse voltage) having a predetermined pattern.

As shown in FIG. 11C, the pattern of the pulse voltage generated by the pulse generator 191 is predefined in such a manner that when the sled motor 107 is driven responsive to the pulse voltage, the motor 107 moves the objective lens 132 back to its home position. The output pulse voltage of the pulse generator 191 is applied to the sled motor 107 by way of the driver 171. In response to the pulse voltage, the sled motor 107 is driven, thereby moving the optical head 103 in the direction in which the objective lens 132 has moved and getting the objective lens 132 back to its home position.

As also shown in FIG. 11C, each pulse voltage consists of first and second (positive and negative) pulse voltages 151 and 152 having mutually different polarities. The absolute value of the first pulse voltage 151 is sufficiently greater than that of the start voltage of the sled motor 107. As used herein, the "start voltage" of the sled motor 107 is a minimum voltage that needs to be applied to the sled motor 10 to start it in the optical disk drive 101. In this case, the absolute value of the first pulse voltage 151 may be about 120% to about 170% of that of the start voltage of the sled motor 107. On the other hand, the absolute value of the second pulse voltage 152 is smaller than that of the first pulse voltage 151. In this case, the absolute value of the second pulse voltage 152 may be about 50% to about 90% of that of the first pulse voltage 151.

When these pulse voltages are applied to the sled motor 107 by way of the driver 171, the sled motor 107 starts, and then accelerates, its rotation responsive to the first pulse voltage 151 but is braked and stopped responsive to the second pulse voltage 152 so as to get the objective lens 132 back to its home position.

Next, it will be described with reference to FIG. 12 how the control unit 109 performs its control over the sled motor 107. First, in Step 201 shown in FIG. 12, the control unit 109 determines whether or not the output signal (or voltage level) of the comparator 124 has changed from L level into H level. If the answer to the query of Step 201 is NO, then the pulse generator 191 outputs no pulse signal (or pulse voltage) in Step 202. In that case, the processing returns to Step 201 to start the processing steps all over again.

On the other hand, if the answer to the query of Step 201 is YES, then the pulse generator 191 generates and outputs the pulse signal (or pulse voltage) in Step 203 as described above. Thereafter, the processing returns to Step 201 to start the processing steps all over again. In this manner, even if any variation has been caused in the load of the optical head moving mechanism, the sled motor 107 still can be rotated and driven stably and accurately.

Although the rotor of the DC motor has a great moment of inertia, the conventional optical disk drive described above can stop the rotor quickly, thus increasing the accuracy of control to a certain degree. The conventional optical disk drive, however, has the following drawbacks.

Firstly, it is difficult for the conventional optical disk drive to control the rotation of the DC motor at a sufficiently small step angle. Thus, the conventional optical disk drive cannot achieve desired high positioning accuracy. To achieve a high resolution by minimizing the step angle, the pulse voltage applied to the DC motor to drive it may have its amplitude (i.e., the level) or pulse width reduced. However, if the level of the pulse voltage is decreased, then the DC motor will be affected by the variation in load or torque more easily, thus making it difficult to minimize the step angle.

On the other hand, if the pulse width is shortened, then the motor might just vibrate but not rotate at all at a certain angle of rotation or less. This phenomenon is brought about by the cogging torque. Specifically, even if the rotor of the motor has rotated to just a small degree by applying the pulse voltage with such a short width thereto, the cogging torque, which rotates the rotor to the opposite direction, is generated and applied to the rotor the instant the drive voltage reaches zero. Thus, the rotor returns to its original position. Accordingly, no matter how many times the same short pulse is applied repeatedly, the rotor will not rotate.

This phenomenon becomes even more noticeable if the driving mechanism that connects the motor to the object of control gets loose and unfixed or exhibits some elasticity due to the deformation. In that case, the motor just vibrates and cannot move the object of control at all. Accordingly, once such a phenomenon has occurred, it is virtually impossible to minimize the step angle by decreasing the amplitude of the pulse voltage or by shortening the pulse width thereof. Thus, the conventional control technique cannot increase the positioning accuracy except a very limited situation.

Furthermore, if the braking pulse is applied to the motor just after the driving pulse has been applied thereto, then the stability of control might be decreased significantly. Also, the load of a driving mechanism is not always the same both in the forward and backward directions. Rather, when the step angle is that small, the load in the forward direction is often different from the load in the backward direction. A difference like that is particularly remarkable when the driving mechanism that connects the motor to the object of control has low rigidity.

For example, some motor controller might get the object of control pressed by a compressed spring so to speak if the controller continues to drive the motor in the same direction. In that case, the load is very heavy for the motor in the forward direction (i.e., the direction in which the motor should move the object) but is extremely small in the backward direction. If a braking pulse, which is smaller in amplitude than the driving pulse by a predetermined percentage, is applied to the motor in such a state, then the motor will rotate in the backward direction. In the worst-case scenario, even the object of control also moves backward, thus deteriorating the stability of control considerably. Accordingly, the braking pulse should have its voltage value and pulse width defined in such a manner as to eliminate that phenomenon. Thus, it is rather imaginable that a braking pulse having such limited voltage value and pulse width is effective insufficiently against the great moment of inertia of the rotor.

In the conventional control technique described above, the amplitude of the pulse voltage applied to the DC motor is about 1.7 times as high as that of the minimum voltage that needs to be applied to the DC motor to start it, thereby attempting to decrease the step angle as much as possible. Also, if the object has moved to less than the predetermined magnitude responsive to the pulse voltage that has been applied to the motor a single time, the same pulse voltage is supposed to be applied a number of times.

However, if the predetermined magnitude of movement is not achieved upon the single application of a pulse voltage having such a small level, then it is highly probable that the object will not move, either, no matter how many times the same small pulse voltage is applied to the motor. The reason is as follows. For example, in the above-described situation where the object of control is getting pressed by a compressed spring so to speak, the slight movement of the object of control further compresses the spring. Thus, in that case, a heavier load will be constituted by the object of control once the pulse voltage has been applied to the motor.

SUMMARY OF THE INVENTION

In order to overcome the problems described above, an object of the present invention is to provide a motor controller that can perform a stabilized and accurate positioning control using a DC motor and a method of driving a DC motor.

Another object of the present invention is to provide a disk drive including such a motor controller.

A motor controller according to a preferred embodiment of the present invention includes a DC motor, a driving mechanism, voltage generating means and control means. The driving mechanism is provided to move an object having a predetermined mass against a load applied to the object and by transmitting a rotational force of the DC motor to the object. The voltage generating means generates first and second voltages. The first voltage has amplitude high enough to rotate the DC motor to such a degree as to get the object moved by the driving mechanism, while the second voltage has the same polarity as the first voltage and has such amplitude as to prevent the DC motor from rotating either in a backward direction due to a cogging torque or in a forward direction. The control means controls the voltage generating means in such a manner that the voltage generating means applies the second voltage to the DC motor after having applied the first voltage to the DC motor.

In one preferred embodiment of the present invention, the control means preferably gets a pulse voltage applied as the first voltage to the DC motor. A pulse width T of the pulse voltage preferably satisfies t≦T≦5t, where t is an electrical time constant of the DC motor.

In another preferred embodiment of the present invention, the first voltage is preferably three times or more as high as a minimum voltage that needs to be applied to the DC motor for the driving mechanism to overcome the load and move the object.

In this particular preferred embodiment, the control means preferably senses the magnitude of movement of the object. If the control means senses that the object has moved to less than a predetermined value, the control means preferably gets the first and second voltages repeatedly applied from the voltage generating means to the DC motor.

More particularly, the control means preferably senses the magnitude of movement of the object. If the control means senses that the object has moved to less than the predetermined value, the control means preferably gets the pulse width T of the pulse voltage increased.

In still another preferred embodiment, the voltage generating means preferably generates the first and second voltages that are both positive or both negative. The control means preferably controls the voltage generating means in such a manner that the voltage generating means selectively applies the positive first and second voltages or the negative first and second voltages to the DC motor. The first and second voltages preferably change their polarity from positive into negative, or vice versa, depending on a direction in which the object should be moved.

In yet another preferred embodiment, the control means preferably controls the voltage generating means in such a manner that the voltage generating means alternately applies the first and second voltages to the DC motor.

In yet another preferred embodiment, the voltage generating means may include a pulse width modulator and may generate the first and second voltages as effective pulse voltages to be output from the pulse width modulator.

In yet another preferred embodiment, if the object is not driven for a predetermined amount of time or more, the amplitude of the second voltage may be decreased.

In yet another preferred embodiment, the voltage generating means preferably includes switching means and generates the first voltage by turning the switching means ON.

A disk drive according to another preferred embodiment of the present invention includes driving means, a head, a head moving mechanism, a DC motor, voltage generating means and control means. The driving means rotates a disk. The head reads and/or writes information from/on the disk. The head moving mechanism moves the head in a radial direction of the disk. The DC motor drives the head moving mechanism. The voltage generating means generates first and second voltages. The first voltage has amplitude high enough to rotate the DC motor to such a degree as to get the head moved by the head moving mechanism, while the second voltage has the same polarity as the first voltage and has such amplitude as to prevent the DC motor from rotating either in a backward direction due to a cogging torque or in a forward direction. The control means controls the voltage generating means in such a manner that the voltage generating means applies the second voltage to the DC motor after having applied the first voltage to the DC motor.

In one preferred embodiment of the present invention, the control means preferably gets a pulse voltage applied as the first voltage to the DC motor. A pulse width T of the pulse voltage preferably satisfies t≦T≦5t, where t is an electrical time constant of the DC motor.

In another preferred embodiment of the present invention, the first voltage is preferably three times or more as high as a minimum voltage that needs to be applied to the DC motor for the head moving mechanism to overcome a load applied to the head and move the head.

In still another preferred embodiment, the control means preferably controls the voltage generating means in such a manner that the voltage generating means alternately applies the first and second voltages to the DC motor.

In yet another preferred embodiment, the voltage generating means may include a pulse width modulator and may generate the first and second voltages as effective pulse voltages to be output from the pulse width modulator.

Another preferred embodiment of the present invention provides a method of driving a DC motor for the purpose of transmitting a rotational force of the DC motor to an object, having a predetermined mass, by way of a driving mechanism. The driving mechanism is coupled to the DC motor and moves the object against a load applied to the object. The method includes the step of (a) generating first and second voltages. The first voltage has amplitude high enough to rotate the DC motor, while the second voltage has the same polarity as the first voltage and has such amplitude as to prevent the DC motor from rotating either in a backward direction due to a cogging torque or in a forward direction. The method further includes the steps of (b) applying the first voltage to the DC motor and then (c) applying the second voltage to the DC motor.

In one preferred embodiment of the present invention, the step (b) preferably includes the step of applying a pulse voltage as the first voltage to the DC motor. A pulse width T of the pulse voltage preferably satisfies $t \leq T \leq 5t$, where t is an electrical time constant of the DC motor.

In another preferred embodiment of the present invention, the step (b) preferably includes the step of applying the first voltage, which is three times or more as high as a minimum voltage that needs to be applied to the DC motor for the driving mechanism to overcome the load and move the object, to the DC motor.

In still another preferred embodiment, the method may further include the step of alternately applying the first and second voltages to the DC motor.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 11A, 11B and 11C are timing diagrams showing the respective waveforms of signals that are generated in the optical disk drive shown in FIG. 10A.

FIG. 12 is a flowchart showing how a sled control is carried out in the optical disk drive shown in FIG. 10A.

DETAILED DESCRIPTION OF PREFERRED EMBODIMENTS

Embodiment 1

Hereinafter, a motor controller according to a first specific preferred embodiment of the present invention will be described with reference to the accompanying drawings.

Figure 1:
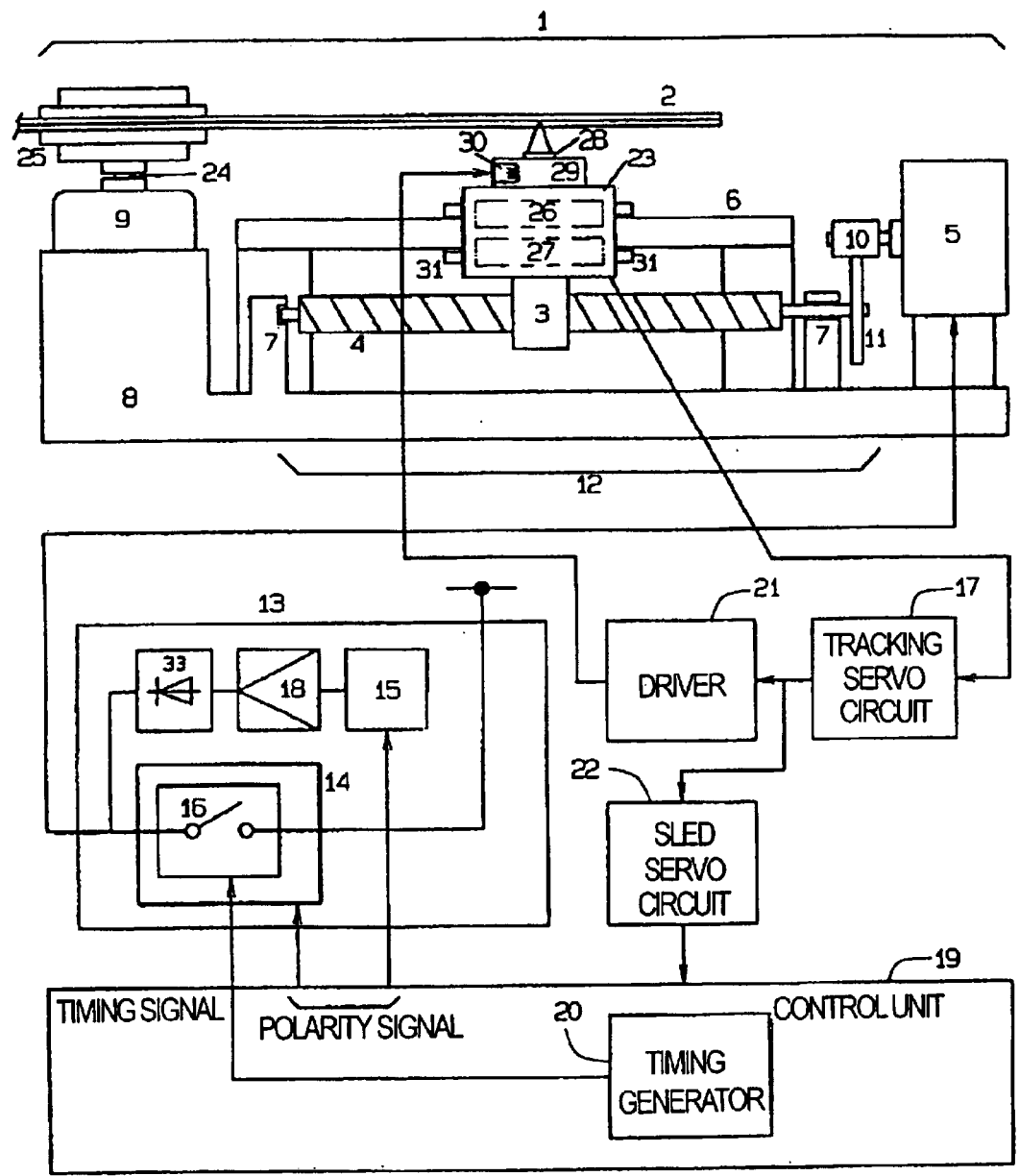
FIG. 1 schematically illustrates an optical disk drive including a motor controller according to a first specific preferred embodiment of the present invention.

FIG. 1 schematically illustrates the main section of an optical disk drive 1 including the motor controller of the first preferred embodiment. The optical disk drive 1 may be used to read and/or write information from/on an optical disk 2 such as a DVD-RAM, on which spiral tracks are formed.

The optical disk drive 1 includes a rotating/driving mechanism for use to rotate the optical disk 2 that has been mounted thereon. The rotating/driving mechanism includes spindle motor 9, turntable 25 and driver (not shown). The turntable 25 is fitted with the shaft 24 of the spindle motor 9 to mount the optical disk 2 thereon. The driver is used to drive the spindle motor 9.

The optical disk drive 1 further includes optical head (or optical pickup) 23, optical head moving mechanism 12 and DC motor 5. The optical head 23 is movable in the radial direction of the optical disk 2 that has been mounted on the turntable 25. The optical head moving mechanism 12 is provided as a driving mechanism for moving the optical head 23 in the radial direction. The DC motor 5 is provided to drive the optical head moving mechanism 12. To control the optical head 23 and the optical head moving mechanism 12, the optical disk drive 1 further includes control unit 19, tracking servo circuit 17, driver 21, sled servo circuit 22 and voltage generator circuit 13, which are stored in a casing (not shown). The radial direction of the optical disk 2 will be herein simply referred to as a "radial direction". The tracking servo circuit 17, driver 21 and sled servo circuit 22 may be known components that are normally included in a conventional disc drive for compact discs.

The optical head 23 includes laser diode 26 as a light source, divided photodiode 27 as a photodetector, objective lens (condenser lens) 28 and actuator 29.

The objective lens 28 is supported by a suspension spring (not shown), which is provided for the optical head 23 to apply an elastic force thereto. The objective lens 28 is movable both in the radial direction and in a direction parallel to the axis of rotation of the optical disk 2 (i.e., along the optical axis of the objective lens 28) with respect to the optical head 23. When the objective lens 28 shifts from its neutral position, an elastic force is applied from the suspension spring to the objective lens 28 toward its neutral position. The direction parallel to the axis of rotation of the optical disk 2 will be herein simply referred to as a "rotation axis direction".

The actuator 29 includes a focus actuator (not shown) and a tracking actuator 30. The focus actuator is provided to move the objective lens 28 in the rotation axis direction with respect to the optical head 23. The tracking actuator 30 is provided to move the objective lens 28 in the radial direction from its home position that is defined over the optical head 23. In this optical disk drive 1, various conditions (e.g., the positions) of the tracking actuator 30 and the suspension spring are adjusted so that the home position matches with the neutral position.

While no voltage is applied to the tracking actuator 30, the objective lens 28 is located at its home position due to the elastic force applied from the suspension spring to the objective lens 28. But when a predetermined voltage is applied to the tracking actuator 30 by way of the driver 21, the tracking actuator 30 moves the objective lens 28 in the radial direction in accordance with the polarity and the amplitude of the voltage. Specifically, the polarity of the voltage determines the direction in which the objective lens 28 should move, while the amplitude of the voltage determines the distance for which the objective lens 28 should move from its home position.

The optical head moving mechanism 12 includes nut piece 3, lead screw 4, guide shaft 6, bearings 7, pinion 10, spur gear 11 and supporting members (sliders) 31. The lead screw 4 is coupled together with the spur gear 11 and supported in a rotatable state on the bearings 7. The lead screw 4 has a screw pitch of about 4 mm. The bearings 7 are fixed on a chassis 8. The spur gear 11 engages with the pinion 10 that is directly coupled to the output shaft of the DC motor 5. Accordingly, the number of revolutions of the DC motor 5 is decreased and then transmitted to the lead screw 4.

The nut piece 3 is secured to the optical head 23 and engaged with the thread groove of the lead screw 4. A spring (not shown) applies an elastic force to one end of the nut piece 3. The supporting members 31, which are supported by the guide shaft 6, are secured to the optical head 23 so that the optical head 23 can move smoothly when the nut piece 3 moves with the lead screw 4 rotating.

The optical head moving mechanism 12 having such a structure transforms the rotational motion of the DC motor 5 into a linear motion, thereby overcoming a load created by the mass of the optical head 23 and the mechanism itself and moving the optical head 23 in the radial direction of the optical disk 2. The deceleration ratio caused by the pinion 10 and the spur gear 11 is two. Accordingly, the optical head 23 moves 2 mm per revolution of the DC motor 5. The maximum number of revolutions per minute of the DC motor 5 is 9,000 rpm. Accordingly, the optical head 23 can be moved at a maximum velocity of 300 mm/s, thereby realizing a high-speed seek operation. To achieve a positioning accuracy of ±20 $\mu$m as required for a DVD-RAM, the rotor of the DC motor 5 should stop at a step angle of ±3.6 degrees or less.

The DC motor 5 is a small-sized three-pole motor that uses permanent magnets as its fields. In this DC motor 5, its fields are permanent magnets and require small spaces, and therefore, its rotor may have a relatively large diameter. Also, due to its small size, the DC motor 5 can operate at a low voltage rather efficiently. However, such a rotor has a great moment of inertia as already described for the background of the invention.

By using its brush and commutator, the DC motor 5 can rotate only with a DC power supplied and without using any special driver. The average output torque per revolution (i.e., 360 degrees) of the DC motor 5 is substantially proportional to the drive current. However, since this DC motor 5 switches the excitation by using mechanical contact points and also has a small number of poles, a relatively great variation should be caused in the output torque per revolution. Accordingly, if the DC motor 5 is rotated to just a small step angle of 3.6 degrees, for example, then the torque will be variable significantly depending on the angular position of the rotor. Nevertheless, even taking the possible variation in the torque of the DC motor 5 itself, the frictional load or the load applied to the optical head moving mechanism 12 into account, the DC motor 5 can be started as intended by applying a voltage of about 1.5 V thereto.

The voltage generator circuit 13 includes amplifier 18, reverse current checker 33, first voltage generator 14 and second voltage generator 15, and receives a timing signal and a polarity signal from the control unit 19 as will be described later. The first voltage generator 14 includes a voltage selector 16 and is connected to a 5 V power supply (not shown). This optical disk drive 1 is also driven by a 5 V power supply, and therefore, a supply voltage of 5 V is actually the highest voltage and most likely used for the optical disk drive 1.

The voltage selector 16 may be implemented as a semiconductor device, for example, and turns ON or OFF in response to the timing signal supplied from the control unit 19. When the voltage selector 16 turns ON, the power supply is directly connected to the DC motor 5 via low impedance. Thus, a voltage approximately equal to the supply voltage of 5 V is applied to the DC motor 5. The voltage selector 16 actually includes a plurality of semiconductor devices so as to invert the polarity of the voltage, responsive to the polarity signal supplied from the control unit 19, when the optical head 23 should be transported in the opposite direction. Since the voltage selector 16 is made up of semiconductor devices, the voltage selector 16 in the ON state has a slight ON-state resistance. For that reason, the output voltage of the first voltage generator 14 is not quite equal to the supply voltage but the difference is a negligible one. Thus, the output voltage of the first voltage generator 14 is herein supposed to be 5 V.

The actual output voltage of the first voltage generator 14 is preferably at least three times as high as a minimum voltage (e.g., 1.5 V) that needs to be applied to the DC motor 5 to start it. The former voltage will be herein referred to as a "first voltages". By applying the first voltage to the DC motor 5, the DC motor 5 can rotate to such a degree as to get the optical head 23 moved by the optical head moving mechanism 12.

The second voltage generator 15 generates a second voltage, which is smaller in amplitude than the first voltage. The second voltage has such amplitude as to prevent the DC motor 5 from rotating either in the backward direction due to its own cogging torque or in the forward direction by overcoming the load (i.e., the optical head moving mechanism 12) applied thereto. As used herein, the "forward direction" refers to the direction that is defined by the polarity of the first voltage while the "backward direction" refers to the direction opposite to the former direction. In this preferred embodiment, the second voltage may be about 0.2 V, for example. The second voltage generator 15 also receives the polarity signal from the control unit 19 so as to invert the polarity of its second voltage responsive to the polarity signal.

The output voltage of the second voltage generator 15 is input to the amplifier 18. The amplifier 18 is a current amplifier and outputs the same voltage as its input voltage at an impedance low enough to drive the DC motor 5. The output of the amplifier 18 is supplied to the DC motor 5 by way of the reverse current checker 33.

The reverse current checker 33 may be a diode, for example, and prevents the output current of the first voltage generator 14 from flowing in the reverse direction toward the amplifier 18 while the voltage selector 16 is ON. By providing this reverse current checker 33, the second voltage of 0.2 V can be applied from the second voltage generator 15 to the DC motor 5 while the voltage selector 16 is OFF, and the first voltage of 5 V can be applied from the first voltage generator 14 to the DC motor 5 while the voltage selector 16 is ON.

The control unit 19 may be implemented as a microprocessor (or CPU) with memories and performs an overall control on the optical head 23, DC motor 5, spindle motor 9, tracking servo circuit 17, sled servo circuit 22 and other components of the optical disk drive 1. The control unit 19 includes a timing generator 20, which may be implemented as a timer, for example. The timing generator 20 outputs the timing signal to the voltage selector 16, thereby turning the voltage selector 16 ON and getting the supply voltage of 5 V applied as a pulse voltage to DC motor 5 for just a short period of time.

Hereinafter, it will be described how the optical disk drive 1 operates. The optical disk drive 1 moves the optical head 23 to a target track (or target address), where the optical disk drive 1 reads and/or writes information from/on the optical disk 2 while performing focus control, tracking control, sled control, rotational velocity control and other controls. Among these various types of controls, the focus and rotational velocity controls of the optical disk drive 1 may be carried out as in the conventional optical disk drive, and the description thereof will be omitted herein.

Thus, the tracking control performed by the optical disk drive 1 will be described first. When the optical disk drive 1 performs the tracking control, first, the laser diode 26 of the optical head 23 emits a laser beam toward the optical disk 2. The laser beam that has been reflected from the optical disk 2 is received at the divided photodiode 27. Then, the photodiode 27 converts the received laser beam into a voltage photoelectrically, thereby outputting the resultant voltage signal to the tracking servo circuit 17. In response to the voltage signal that has been supplied from the photodiode 27, the tracking servo circuit 17 generates a tracking error signal TE as a voltage signal. The tracking error signal TE represents how much the objective lens 28 is shifted from the center of the target track in the radial direction.

The tracking servo circuit 17 also generates a tracking servo signal TS as another voltage signal by performing predetermined signal processing, including phase inversion and amplification, on the tracking error signal TE. The tracking servo signal TS is generated to drive the tracking actuator 29 in such a manner that the objective lens 28 moves to the center of the target track (i.e., so that the tracking error signal TE has a zero level). That is to say, the tracking servo signal TS may also be regarded as a drive voltage for the tracking actuator 29. Accordingly, the voltage value of the tracking servo signal TS corresponds to the shift of the objective lens 28 from the center of the target track, while the sign of the tracking servo signal TS represents the direction of the shift. The tracking servo signal TS is input not just to the tracking actuator 29 via the driver 21 but also to the sled servo circuit 22.

The tracking actuator 29 is driven responsive to the tracking servo signal TS. By driving the tracking actuator 29, the objective lens 28 can be moved toward the center of the target track, which operation is normally called a "tracking servo".

However, if the objective lens 28 is moved continuously by driving the tracking actuator 29, then the objective lens 28 will soon reach a limit of its movable range inside the optical head 23 and will not be able to move and follow the track anymore. Likewise, the tracking actuator 29 cannot move the objective lens 28 beyond its limit, either. Thus, by driving the DC motor 5, the optical head 23 is moved in the direction in which the objective lens 28 has moved so that the objective lens 28 returns to its home position. This is so-called "sled control".

Normally, in a read-only CD-ROM drive, the range in which the tracking actuator 29 can make the objective lens 28 follow the target track is defined approximately as ±200 $\mu$m. If the target track is located outside of this range, then the sled control is carried out to move the optical head 23 and to make the target track fall within this range. In this case, the positioning accuracy of the optical head 23 with respect to the target track should be within ±200 $\mu$m. As for a DVD-RAM, which has a greater storage capacity than a CD-ROM and on which information can be written, this range is even narrower and typically within ±20 $\mu$m. Accordingly, the positioning accuracy of the optical head 23 with respect to the target track should also be within ±20 $\mu$m.

According to preferred embodiments of the present invention, the DC motor 5 is driven by a unique method to perform the sled control. Hereinafter, it will be described in detail how to carry out the sled control in this preferred embodiment of the present invention.

Specifically, the sled servo circuit 22 performs predetermined signal processing, including removal of high frequency components and amplification, on the tracking servo signal TS that has been supplied from the tracking servo circuit 17, thereby generating a sled servo signal SS. That is to say, the voltage value of the sled servo signal SS corresponds to the shift of the objective lens 28 from the center of the target track, while the sign of the sled servo signal SS represents the direction of the shift.

The sled servo signal SS represents a voltage corresponding to the drive voltage of the tracking actuator 29. Therefore, if the voltage represented by the sled servo signal SS has an absolute value greater than a certain reference value, then the sled control is carried out to move the optical head 23.

For that purpose, the sled servo signal SS is input to the control unit 19 to monitor the absolute value of the voltage represented by the sled servo signal SS. If the voltage represented by the sled servo signal SS has an absolute value greater than the reference value, then the timing generator 20 outputs the timing signal to the voltage selector 16 for a short time. As a result, the first voltage of 5 V is applied from the first voltage generator 14 to the DC motor 5 while the timing signal is being output. On the other hand, if the voltage represented by the sled servo signal SS has an absolute value equal to or smaller than the reference value, then no timing signal is output and no voltage is applied from the first voltage generator 14 to the DC motor 5. Instead, the second voltage of 0.2 V is applied from the second voltage generator 15 to the DC motor 5.

In this manner, if the absolute value of the sled servo signal SS is equal to or smaller than the reference value, the second voltage of 0.2 V is applied to the DC motor 5. However, once the absolute value of the sled servo signal SS exceeds the reference value, the first voltage of 5 V is applied to the DC motor 5 for a short time (e.g., 300 $\mu$s). When the timing signal has been output, the second voltage of 0.2 V will be applied to the DC motor 5 again.

The short time interval T during which the timing signal is output and the electrical time constant t of the DC motor 5 preferably satisfy $t \leq T \leq 5t$. The reason is as follows. Specifically, if the time interval T of the timing signal is shorter than the electrical time constant t of the DC motor 5, then the first voltage is applied to the DC motor 5 for too short a time to drive the DC motor 5. On the other hand, if the time interval T of the timing signal is more than 5 times as long as the electrical time constant t of the DC motor 5, then the step angle of the DC motor 5 will be too large to control the optical head 23 precisely. In this preferred embodiment, the electrical time constant t of the DC motor 5 is 100 $\mu$s. Thus, the time interval T of the timing signal is set to 300 $\mu$s, which is three times as long as the electrical time constant t of the DC motor 5.

Figure 2:
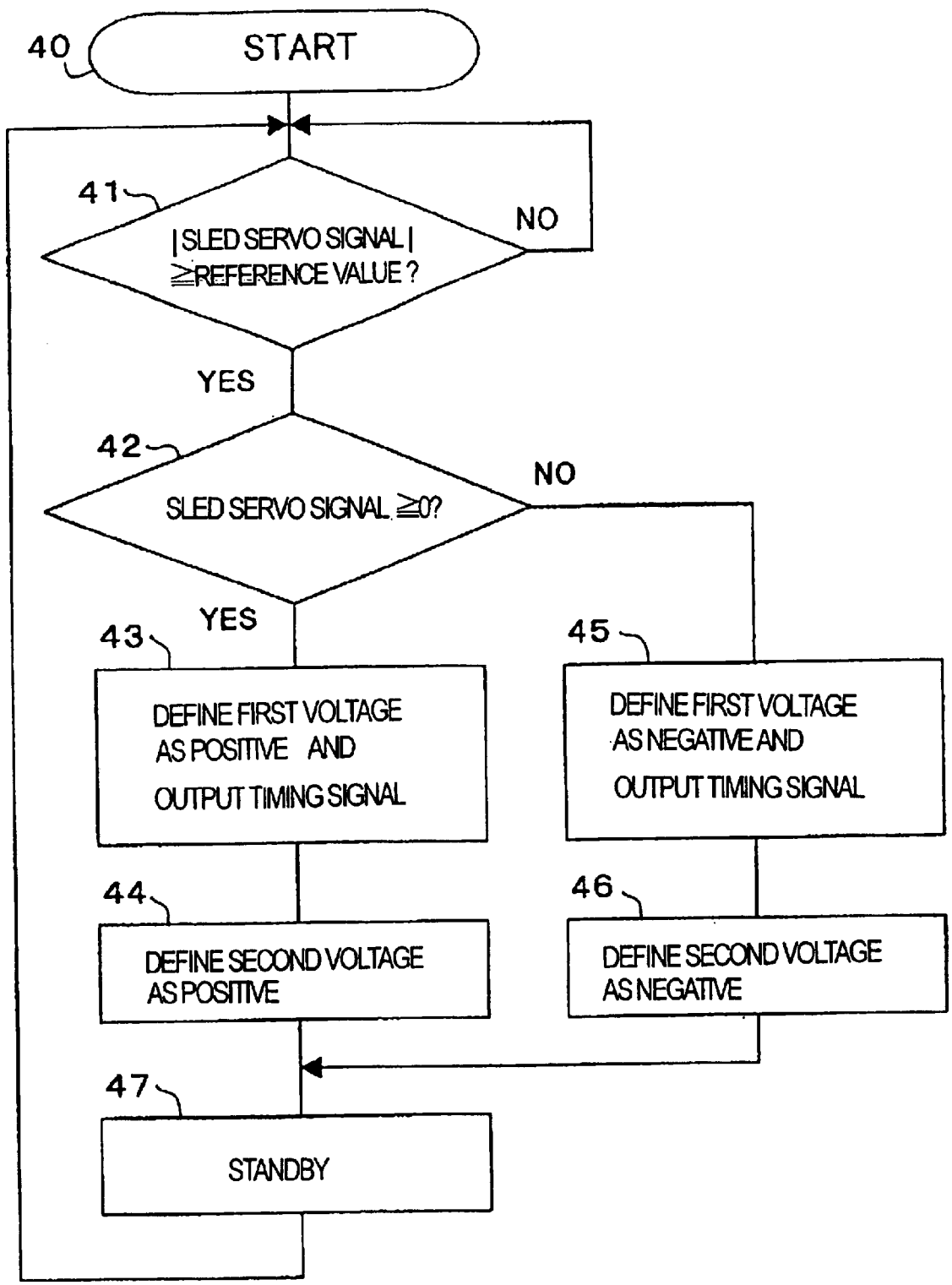
FIG. 2 is a flowchart showing how the optical disk drive shown in FIG. 1 performs a sled control.

Next, it will be described in further detail with reference to FIG. 2 how to perform the sled control using the sled servo signal SS. FIG. 2 is a flowchart showing how the control unit 19 of the optical disk drive 1 operates.

First, in Step 41, the control unit 19 determines whether or not the absolute value of the sled servo signal has exceeded the reference value. As described above, the voltage value of the sled servo signal SS represents how much and in which direction the objective lens 28 is shifted from its home position. The reference value is defined so as to correspond to a shift that falls within the range in which the tracking actuator 29 can make the objective lens 28 follow the track. If the answer to the query of Step 41 is NO, Step 41 is carried out again.

On the other hand, if the answer to the query of Step 41 is YES, then the control unit 19 detects the polarity of the sled servo signal SS in Step 42. If the polarity of the sled servo signal SS is found positive, then the control unit 19 supplies the polarity signal to the first voltage generator 14, thereby defining the output of the first voltage generator 14 as positive in Step 43. Also, the control unit 19 instructs the timing generator 20 to output the timing signal to the first voltage generator 14, thereby making the voltage generator circuit 13 output the positive first voltage as a pulse voltage, which is applied to the DC motor 5. Next, in Step 44, the control unit 19 applies the polarity signal to the second voltage generator 15 to define the output of the second voltage generator 15 as positive. That is to say, as soon as the Step 43 of outputting the first voltage is finished, the second voltage having the same polarity as the first voltage will be output from the second voltage generator 15 in Step 44. Subsequently, when a predetermined amount of standby time provided for Step 47 passes, the processing will return to Step 41 again.

On the other hand, if the polarity of the sled servo signal SS is found negative in Step 42, then the control unit 19 supplies the polarity signal to the first voltage generator 14, thereby defining the output of the first voltage generator 14 as negative in Step 45. Also, the control unit 19 instructs the timing generator 20 to output the timing signal to the first voltage generator 14, thereby making the voltage generator circuit 13 output the negative first voltage as a pulse voltage, which is applied to the DC motor 5. Next, in Step 46, the control unit 19 applies the polarity signal to the second voltage generator 15 to define the output of the second voltage generator 15 as negative. That is to say, as soon as the Step 45 of outputting the first voltage is finished, the second voltage having the same polarity as the first voltage will be output from the second voltage generator 15 in Step 46. Subsequently, when a predetermined amount of standby time provided for Step 47 passes, the processing will return to Step 41 again.

Figure 3:
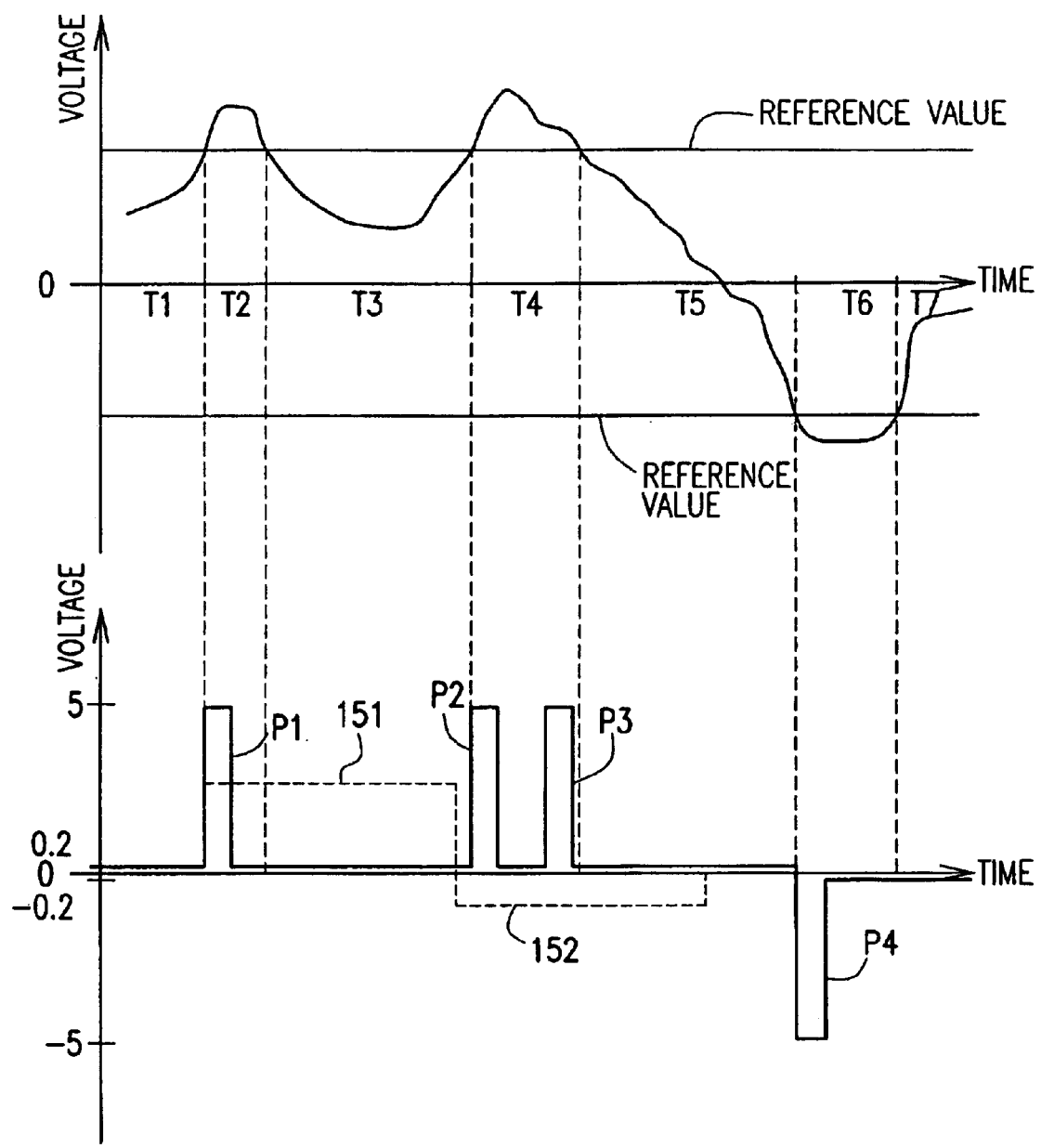
FIG. 3 is a timing diagram showing a relationship between the sled servo signal and the output voltages of the voltage generators in the optical disk drive shown in FIG. 1.

FIG. 3 is a graph showing a relationship between the sled servo signal and the voltage applied to the DC motor 5. Hereinafter, the voltages output from the voltage generator circuit 13 in response to the sled servo signal will be described with reference to FIGS. 2 and 3.

In a time interval T1 just after the control unit 19 has started to perform the sled control, the sled servo signal SS has a positive value smaller than the reference value. When the sled servo signal SS is positive, the objective lens 28 has been shifted toward the outer periphery of the optical disk 2. During this interval T1, the control unit 19 performs Step S41 repeatedly. As already described with reference to FIG. 1, while the first voltage generator 14 of the voltage generator circuit 13 is not outputting the first voltage, the second voltage generator 15 thereof always outputs the second voltage. Accordingly, the voltage generator circuit 13 is outputting the second voltage of +0.2 V in the interval T1 in the example shown in FIG. 3. In this interval T1, however, as long as no voltage is output from the first voltage generator 14, the voltage generator circuit 13 may output any voltage, e.g., −0.2 V or 0 V. In any case, the absolute value of the output voltage is smaller than that of the minimum voltage of 1.5 V that needs to be applied to the DC motor 5 to start it. Thus, the DC motor 5 remains stopped.

In the next interval T2, the sled servo signal has a positive value that is greater than the reference value. Accordingly, the control unit 19 performs Steps 41, 42 and 43 shown in FIG. 2, thereby making the first voltage generator 14 generate and output the positive first voltage of +5 V. Thus, the voltage generator circuit 13 applies the first voltage as a pulse voltage P1 to the DC motor 5 for 300 µs. The pulse voltage P1 is sufficiently greater than the minimum voltage of 1.5 V that needs to be applied to the DC motor 5 to start it. Accordingly, the DC motor 5 starts to rotate. Thereafter, the control unit 19 performs Steps 44 and 47. That is to say, as soon as the first voltage has been output, the positive second voltage of +0.2 V will be output from the second voltage generator 15. In this manner, the instant the pulse voltage P1 has been output from the voltage generator circuit 13, the positive second voltage will be applied to the DC motor 5.

When the DC motor 5 has rotated to a predetermined angle responsive to the pulse voltage P1, the DC motor 5 will stop rotating. At that point in time, the rotor of the DC motor 5 might rotate in the backward direction due to the cogging torque of the DC motor 5. In this preferred embodiment, however, the second voltage, having the same polarity as the pulse voltage P1, is continuously applied to the DC motor 5. Accordingly, it is possible to prevent the rotor from rotating in the backward direction. As a result, the DC motor 5 rotates to at least the angle corresponding to the drive pulse voltage P1 applied and then stops.

Since the positive voltage is applied to the DC motor 5, the DC motor 5 rotates in such a direction as to get the optical head 23 moved toward the outer periphery of the optical disk 2. As a result, the position of the objective lens 28 is adjusted and the voltage value of the sled servo signal SS decreases to less than the reference value. Accordingly, in the next interval T3, the control unit 19 repeatedly performs Step 41 again. In the meantime, the voltage generator circuit 13 is outputting the positive second voltage of +0.2 V.

In the next interval T4, the sled servo signal SS has a positive value greater than the reference value again. Accordingly, as in the interval T2, the voltage generator circuit 13 applies the positive first voltage as a pulse voltage P2 to the DC motor 5. As soon as the pulse voltage P2 has been applied, the positive second voltage will be applied. Thus, the DC motor 5 rotates to the predetermined angle and then stops without rotating in the backward direction. The optical head 23 also moves outward. In this interval T4, however, the position of the objective lens 28 is still shifted from its home position. For that reason, the voltage value of the sled servo signal SS is greater than the reference value. Accordingly, Steps 41, 42, 43 and 44 are repeatedly performed, the positive first voltage is applied as a pulse voltage P3 to the DC motor 5 and then the positive second voltage of +0.2 V is applied to the DC motor 5. As a result, the optical head 23 moves again and the voltage value of the sled servo signal SS decreases to less than the reference value.

In the next interval T5, the absolute value of the sled servo signal SS is less than the reference value but its sign changes from positive into negative. However, since the absolute value of the sled servo signal SS is less than the reference value, the control unit 19 repeatedly performs Step 41. In the meantime, the voltage generator circuit 13 is outputting the positive second voltage.

In the next interval T6, the sled servo signal SS has a negative voltage having an absolute value greater than the reference value. When the sled servo signal SS is negative, the objective lens 28 has been shifted toward the inner periphery of the optical disk 2. Accordingly, the control unit 19 performs Steps 41, 42 and 45 shown in FIG. 2, thereby making the first voltage generator 14 generate and output the negative first voltage of −5 V. Thus, the voltage generator circuit 13 applies the negative first voltage as a pulse voltage P4 to the DC motor 5 for 300 $\mu$s. The pulse voltage P4 has an absolute value that is sufficiently greater than that of the minimum voltage of 1.5 V that needs to be applied to the DC motor 5 to start it. Accordingly, the DC motor 5 rotates. In this interval T6, however, the DC motor 5 rotates in the opposite direction to that of the interval T2. Thereafter, the control unit 19 performs Steps 46 and 47. That is to say, as soon as the first voltage has been output, the negative second voltage of −0.2 V will be generated and output from the second voltage generator 15. In this manner, the instant the pulse voltage P4 has been output from the voltage generator circuit 13, the negative second voltage will be applied to the DC motor 5.

As soon as the pulse voltage P4 has been applied to the DC motor 5, the second voltage having the same polarity as the pulse voltage P4 is applied to the DC motor 5. Accordingly, the DC motor 5 does not rotate in the opposite direction due to the cogging torque but rotates exactly to the angle corresponding to the drive pulse voltage P4 and then stops. As the DC motor 5 rotates, the optical head 23 moves toward the inner periphery of the optical disk 2. As a result, the position of the objective lens 28 is adjusted and the absolute value of the sled servo signal SS decreases to less than the reference value. Thus, in the next interval T7, the control unit 19 repeatedly performs Step 41 again. In the meantime, the voltage generator circuit 13 is outputting the negative second voltage of −0.2 V.

In this preferred embodiment, the optical head 23 moves about 10 $\mu$m responsive to each of the pulse voltages P1 through P4. Thus, the shift of the objective lens 28 from its home position is decreased by 10 $\mu$m per pulse so as to fall within the ±20 $\mu$m range in the end. That is to say, the relative position of the target track can be moved to within the range of ±20 $\mu$m in which the tracking actuator 29 can make the objective lens 28 follow the track.

It should be noted that in an interval between the application of a first voltage as a pulse voltage P1, P2, . . . , etc. and the next application of another first voltage as a pulse voltage P2, P3, . . . , etc., the second voltage having the same polarity as the previous first voltage is preferably applied continuously as shown in FIG. 3. The reason is as follows. In this interval, a cogging torque may have been generated in the DC motor 5 in such a direction as to rotate the DC motor 5 to the backward direction. Accordingly, by applying the second voltage to the DC motor 5, such unwanted reversal can be prevented. In other words, if the application of the second voltage was stopped at any time between the pulse voltages P1 and P2, for example, the DC motor 5 might start to rotate in the backward direction at that point in time.

However, unless the DC motor 5 rotates to the backward direction, the second voltage does not always have to be applied continuously through the interval between two first voltages. For example, the application of the second voltage may be suspended for too short a period of time to allow the DC motor 5 to reverse its direction of rotation. Or the application of the second voltage may also be discontinued by applying a third voltage, also having the same polarity as the first and second voltages and such amplitude as to prevent the DC motor 5 from rotating either in the backward direction or the forward direction, to the DC motor 5 during that interval.

Figure 10A:
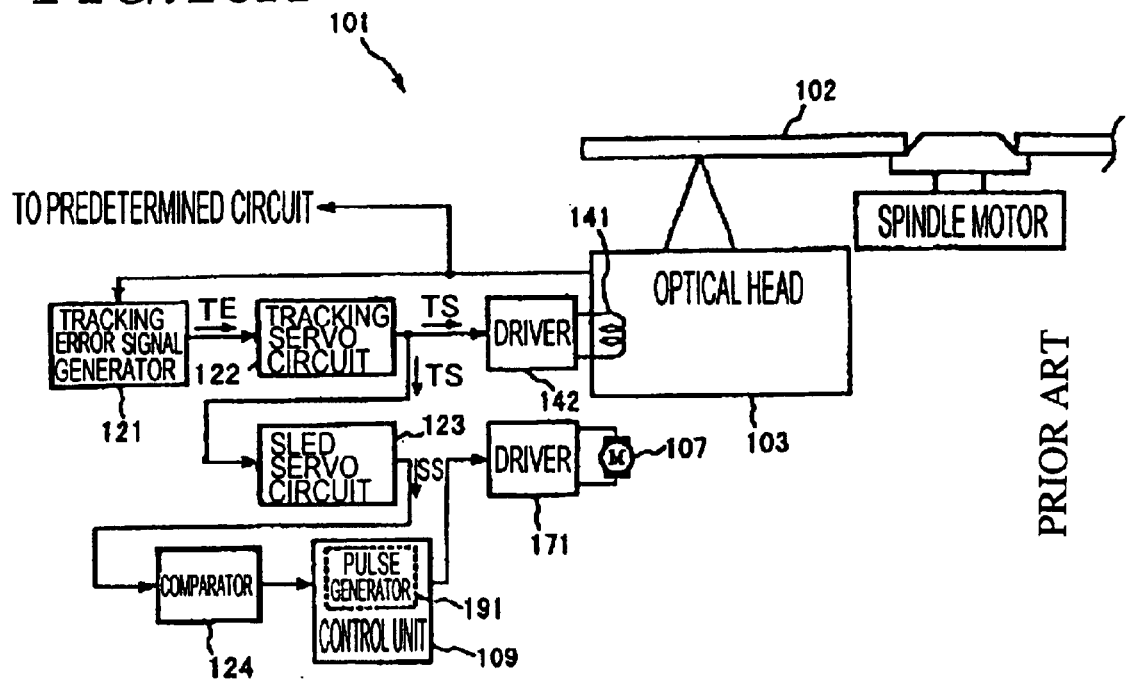
FIG. 10A is a block diagram illustrating a configuration for the main section of a conventional optical disk drive.
Figure 10B:
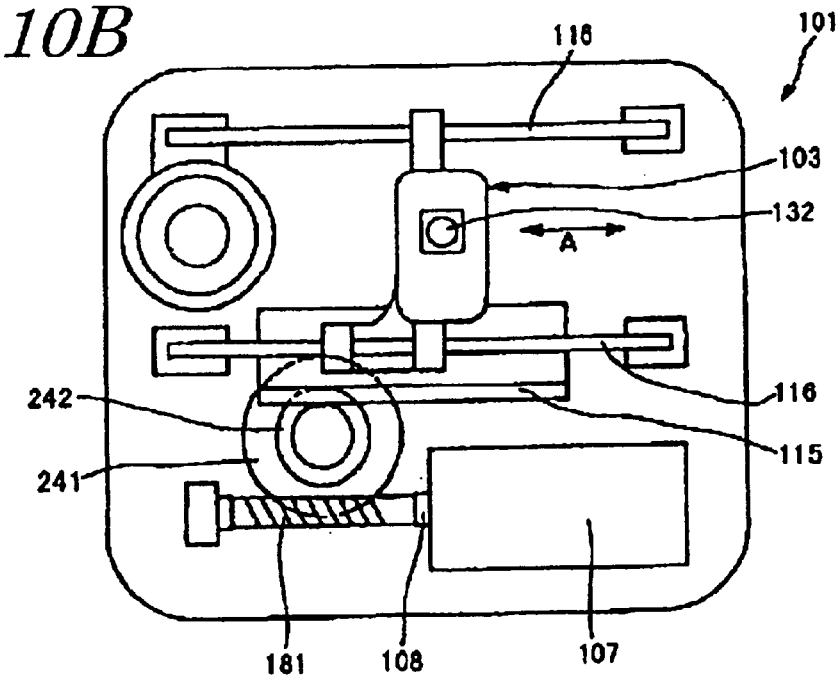
FIG. 10B is a plan view of the optical disk drive shown in FIG. 10A.

In FIG. 3, the pulse voltages 151 and 152 (see FIG. 11C) applied to the DC motor of the conventional disk drive 101 (see FIG. 10) are indicated by the dashed line. As shown in FIG. 3, the first and second pulse voltages 151 and 152 applied to the DC motor of the conventional disk drive to drive it have a pulse width on the order of several milliseconds, which is far greater than that of the pulse voltages for use in the preferred embodiments of the present invention. This is because the conventional disk drive does not intend to control the DC motor at such a small step angle as that used in the preferred embodiments of the present invention. Also, the second pulse voltage 152 is applied for a purpose that is totally different from that of the second voltage applied in the preferred embodiments of the present invention. Specifically, in the prior art, the second pulse voltage 152 is applied as a braking pulse for preventing the rotor of the DC motor that is driven responsive to the first pulse voltage 151 from rotating excessively due to its moment of inertia.

As described above, in the prior art, even if the pulse width of the first and second pulse voltages 151 and 152 is decreased to reduce the step angle of the DC motor, the DC motor will not rotate due to its reversal resulting from the cogging torque and the optical head 103 just vibrates. Thus, according to the conventional technique, the DC motor cannot be controlled at a small step angle.

In contrast, according to the preferred embodiments of the present invention, a first voltage is applied as a pulse to the DC motor to drive it, and then a second voltage having the same polarity as the first voltage is applied thereto to avoid the reversal resulting from the cogging torque. The second voltage does not have so great amplitude as to rotate the DC motor 5 but has amplitude high enough to avoid the reversal due to the cogging torque. In this manner, the reversal due to the cogging torque is avoidable by getting the second voltage applied from the second voltage generator 15 to the DC motor. Accordingly, even if the first voltage is applied for just a short time, the DC motor 5 still can rotate constantly without reversing its direction. As a result, the pulse width of the first voltage applied can be shortened sufficiently and the DC motor 5 can be controlled at a very small step angle.

In addition, when the first voltage is applied for a sufficiently short time, the rotor of the DC motor is not accelerated excessively. Thus, even if the rotor has a great moment of inertia, the inertial force of the rotor can be reduced. Accordingly, the rotor can be stopped just as intended only by the frictional force after having rotated to a very small angle. As a result, the DC motor can be controlled constantly. Furthermore, unlike the prior art, no reversing pulse is used in the preferred embodiments of the present invention. Thus, even if the driving mechanism being driven by the DC motor has a load in the backward direction that is far smaller than a load in the forward direction, no instability will be observed in the operation of the driving mechanism since no reversing pulse is used. Consequently, the DC motor is controllable with high positioning accuracy.

Furthermore, according to the preferred embodiments of the present invention, the first voltage is applied by directly switching the supply voltage of 5 V. Thus, the first voltage can be three times or more as high as the minimum voltage of 1.5 V that needs to be applied to the DC motor 5 to start it.

Figure 4:
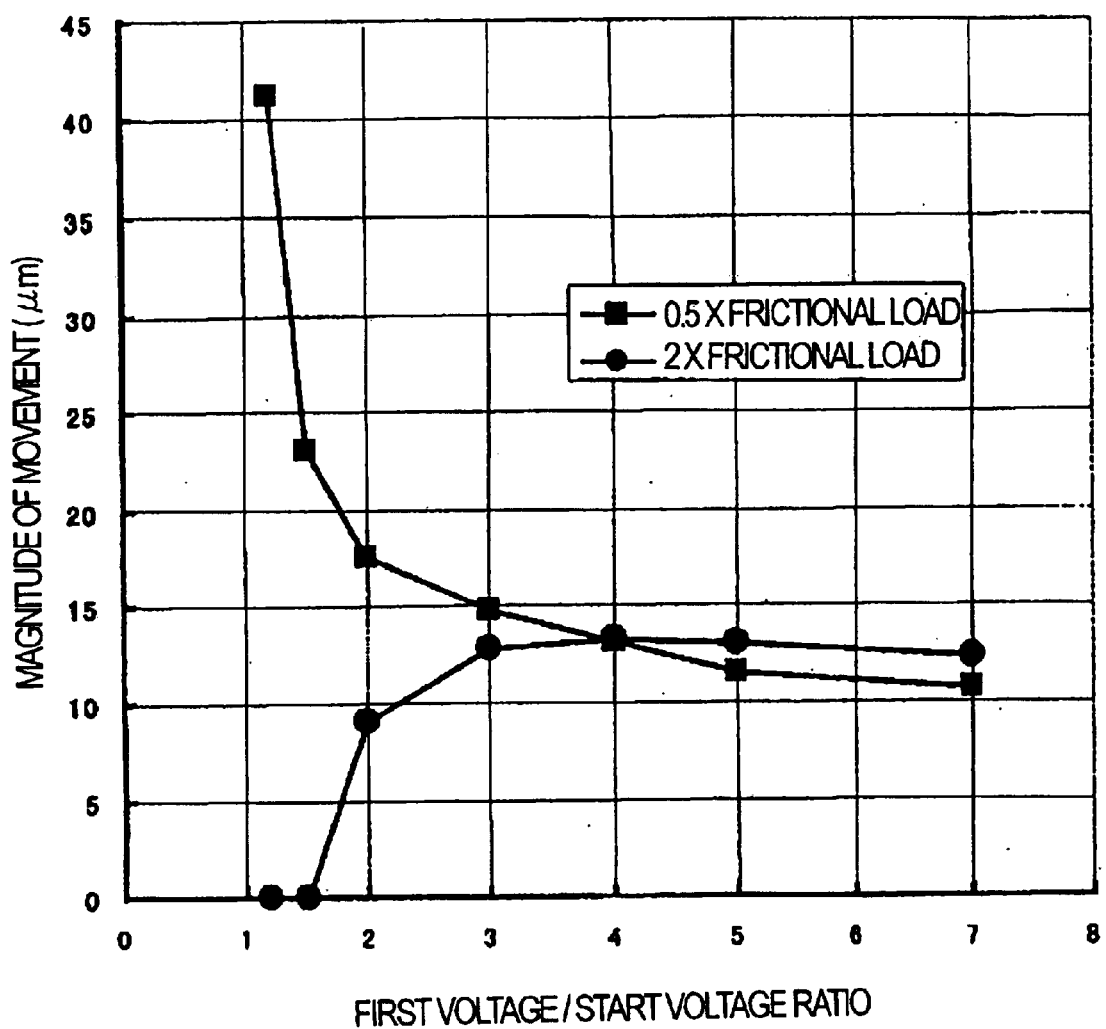
FIG. 4 is a graph showing relationships between the first voltage/start voltage ratio and the magnitude of movement for two different frictional loads.

Next, it will be described with reference to FIG. 4 what effects are achieved by applying such a high voltage as the first voltage. FIG. 4 is a graph showing relationships between the first voltage and the magnitude of movement of the optical head for two different frictional loads. In FIG. 4, the abscissa represents a ratio of the first voltage to the "start voltage". As used herein, the "start voltage" means the minimum voltage that needs to be applied to the DC motor 5 for the optical head moving mechanism 12 to overcome a frictional load applied to the optical head 23 and move the head 23 in the optical disk drive of this preferred embodiment. That is to say, in FIG. 4, the first voltage is changed with respect to the constant start voltage. Also, a pulse width that results in an appropriate magnitude of movement is defined for each first voltage. And for each pulse width obtained in this manner, respective magnitudes of movement are plotted as ordinates in FIG. 4 with respect to two different frictional loads.

The curves shown in FIG. 4 respectively show a situation where the frictional load is doubled (as indicated by solid circles ●) and a situation where the frictional load is halved (as indicated by the solid squares ■) compared to a normal state value. The frictional load will usually change within such a range due to various factors including deterioration with time, abrasion of the driving mechanism and temperature variations.

As can be clearly seen from FIG. 4, where the first voltage/start voltage ratio is less than two, these two curves are far apart from each other. That is to say, if the frictional load is relatively small, the magnitude of movement is excessively great. On the other hand, if the frictional load is relatively large, the magnitude of movement is extremely small.

In contrast, if the first voltage/start voltage ratio is two or more, these two curves approach to each other. And when the first voltage/start voltage ratio is three or more, these two curves substantially match with each other. As can be seen from FIG. 4, if the first voltage/start voltage ratio is two or less, the variation in frictional load changes the magnitude of movement of the optical head significantly. However, if the first voltage/start voltage ratio is three or more, then the magnitude of movement of the optical head remains substantially the same irrespective of the variation in frictional load.

In the preferred embodiment described above, the first voltage is three times or more as high as the start voltage. Accordingly, irrespective of the variation in frictional load, the optical head can be moved just as intended. Thus, even if the optical head has moved to less than the predetermined magnitude of movement responsive to a single drive pulse and if the load at the new position is greater than the load at the original position due to a cogging torque, the optical head still can be moved to the intended position by applying a drive pulse voltage of the same amplitude again. As a result, the optical head is controllable constantly without causing any failure of control.

As described above, according to the preferred embodiment of the present invention, the second voltage generated by the second voltage generator 15 prevents the DC motor 5 from rotating in the backward direction due to a cogging torque. Thus, even if the first voltage is applied to the DC motor 5 for just a short time to drive it, the DC motor 5 still can be driven constantly. For that reason, the pulse width of the first voltage can be shortened and the step angle of the DC motor 5 can be reduced sufficiently. In addition, the DC motor 5 can be rotated to a very small step angle and then stopped only by the frictional force. Accordingly, the DC motor 5 can be operated just as intended without losing stability of control. As a result, sufficiently high positioning accuracy is achieved.

Furthermore, the first voltage is three times or more as high as the start voltage. Accordingly, even if the frictional load has changed significantly, the DC motor 5 still can be driven constantly. That is to say, even in a situation where the DC motor 5 has moved to less than the predetermined magnitude responsive to a single drive pulse and the frictional load has increased considerably, the DC motor 5 still can be driven constantly, moved to the predetermined magnitude, and controlled just as intended by applying the same pulse to the DC motor 5 again.

Embodiment 2

Hereinafter, a motor controller according to a second specific preferred embodiment of the present invention will be described with reference to the accompanying drawings.

Figure 5:
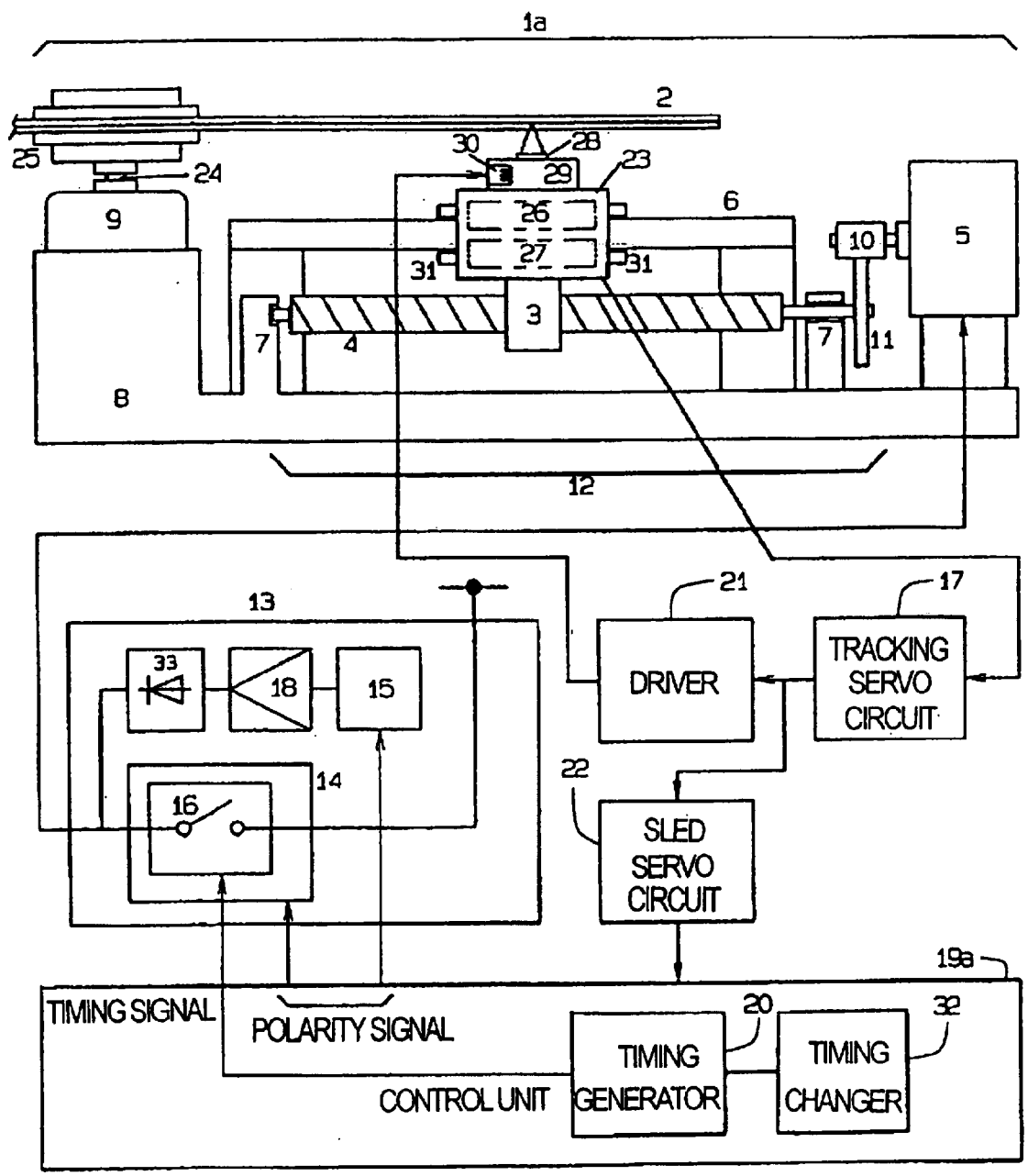
FIG. 5 schematically illustrates an optical disk drive including a motor controller according to a second specific preferred embodiment of the present invention.

FIG. 5 schematically illustrates the main section of an optical disk drive 1a including a motor controller according to the second preferred embodiment. In FIG. 5, each component of the optical disk drive 1a having substantially the same function as the counterpart of the optical disk drive 1 is identified by the same reference numeral.

Unlike the optical disk drive 1 of the first preferred embodiment described above, the optical disk drive 1a of the second preferred embodiment includes a control unit 19a having a timing changer 32. Thus, the following description of the second preferred embodiment will be focused on the operation of the control unit 19a.

As shown in FIG. 5, the control unit 19a includes the timing generator 20 and the timing changer 32. The timing changer 32 changes the interval during which the timing signal is generated by the timing generator 20 (i.e., the interval during which the first voltage is output) approximately proportionally to the absolute value of the sled servo signal. As described above, the first voltage is output when the absolute value of the sled servo signal is greater than a certain reference value. Accordingly, the shortest length of the first voltage output interval is a predetermined value corresponding to the reference value. In this preferred embodiment, the shortest length is also supposed to be 300 μs as in the first preferred embodiment. However, as long as the shortest length T of the first voltage output interval and the time constant t of the DC motor 5 satisfy t≦T≦5t, the shortest length T may be changed into any other value. If the absolute value of the sled servo signal is still greater than the reference value even after the first voltage has been applied to the DC motor 5 by the method to be described later, then the timing changer 32 changes the timing signal interval so that the length of the first voltage output interval as defined by the timing signal is approximately proportional to the absolute value of the sled servo signal.

Figure 6:
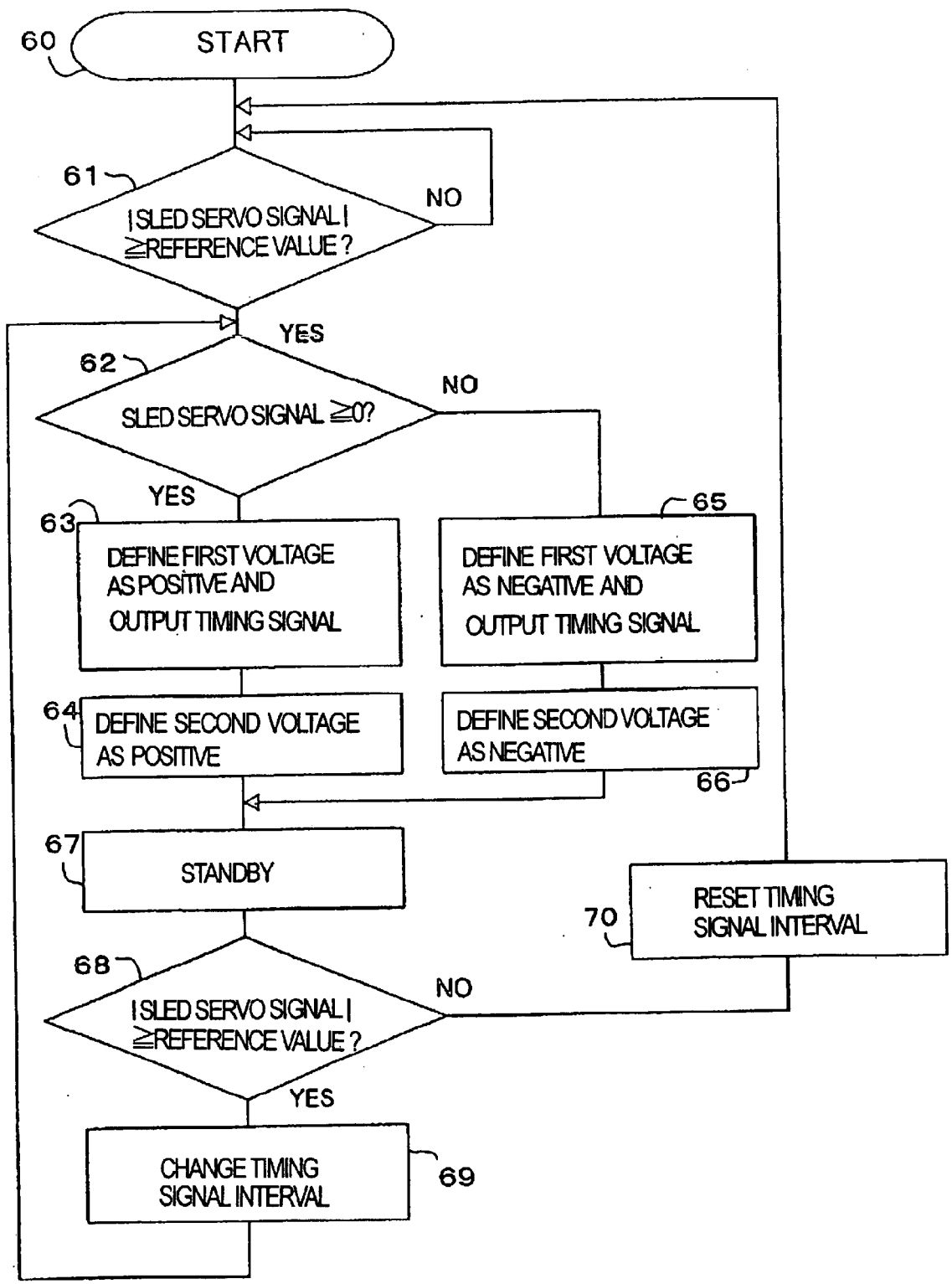
FIG. 6 is a flowchart showing how the optical disk drive shown in FIG. 5 performs a sled control.

Hereinafter, it will be described with reference to FIG. 6 how the control unit 19a of the optical disk drive 1a carries out a sled control. FIG. 6 is a flowchart showing how the control unit 19a performs its sled control operation.

First, in Step 61, the control unit 19a determines whether or not the absolute value of the sled servo signal is greater than a reference value. As already described for the first preferred embodiment, the voltage value of the sled servo signal SS represents how much the objective lens 28 is shifted from its home position. The reference value is defined so as to correspond to a shift that falls within the range in which the tracking actuator 29 can make the objective lens 28 follow the track.

If the answer to the query of Step 61 is NO, Step 61 is carried out again. On the other hand, if the answer to the query of Step 61 is YES, then the control unit 19a detects the polarity of the sled servo signal SS in Step 62.

If the polarity of the sled servo signal SS is found positive in Step 62, then the control unit 19a supplies the polarity signal to the first voltage generator 14, thereby defining the output of the first voltage generator 14 as positive in Step 63. Also, the timing generator 20 outputs the timing signal to the first voltage generator 14, thereby making the voltage generator circuit 13 output the positive first voltage as a pulse voltage, which is applied to the DC motor 5. Next, in Step 64, the control unit 19a applies the polarity signal to the second voltage generator 15 to define the output of the second voltage generator 15 as positive. That is to say, as soon as the Step 63 of outputting the first voltage is finished, the second voltage having the same polarity as the first voltage will be output from the second voltage generator 15 in Step 64. Subsequently, when a predetermined amount of standby time provided for Step 67 passes, the control unit 19a determines again in Step 68 whether or not the absolute value of the sled servo signal is still greater than the reference value.

On the other hand, if the polarity of the sled servo signal SS is found negative in Step 62, then the control unit 19a supplies the polarity signal to the first voltage generator 14, thereby defining the output of the first voltage generator 14 as negative in Step 65. Also, the timing generator 20 outputs the timing signal to the first voltage generator 14, thereby making the voltage generator circuit 13 output the negative first voltage as a pulse voltage, which is applied to the DC motor 5. Next, in Step 66, the control unit 19a applies the polarity signal to the second voltage generator 15 to define the output of the second voltage generator 15 as negative. That is to say, as soon as the Step 65 of outputting the first voltage is finished, the second voltage having the same polarity as the first voltage will be output from the second voltage generator 15 in Step 66. Subsequently, when the predetermined amount of standby time provided for Step 67 passes, the control unit 19a determines again in Step 68 whether or not the absolute value of the sled servo signal is still greater than the reference value.

If the absolute value of the sled servo signal is found still greater than the reference value in Step 68, then the timing changer 32 changes, in Step 69, the interval during which the timing generator 20 generates the timing signal in accordance with the absolute value of the sled servo signal. Thereafter, the processing returns to Step 62.

The same processing steps will be repeatedly performed from Step 62 on. In the meantime, the first voltage is applied to the DC motor 5 for a length of time that is proportional to the absolute value of the sled servo signal. On the other hand, if the absolute value of the sled servo signal is found smaller than the reference value in Step 68, then the interval during which the timing generator 20 generates the timing signal is reset in Step 70 and then the processing returns to Step 61. Once the timing signal interval is reset in Step 70, the first voltage will be applied to the DC motor 5 for 300 $\mu$s, which is the predetermined initial value, in Step 63 or 65 to be carried out after the Step 70.

Figure 7:
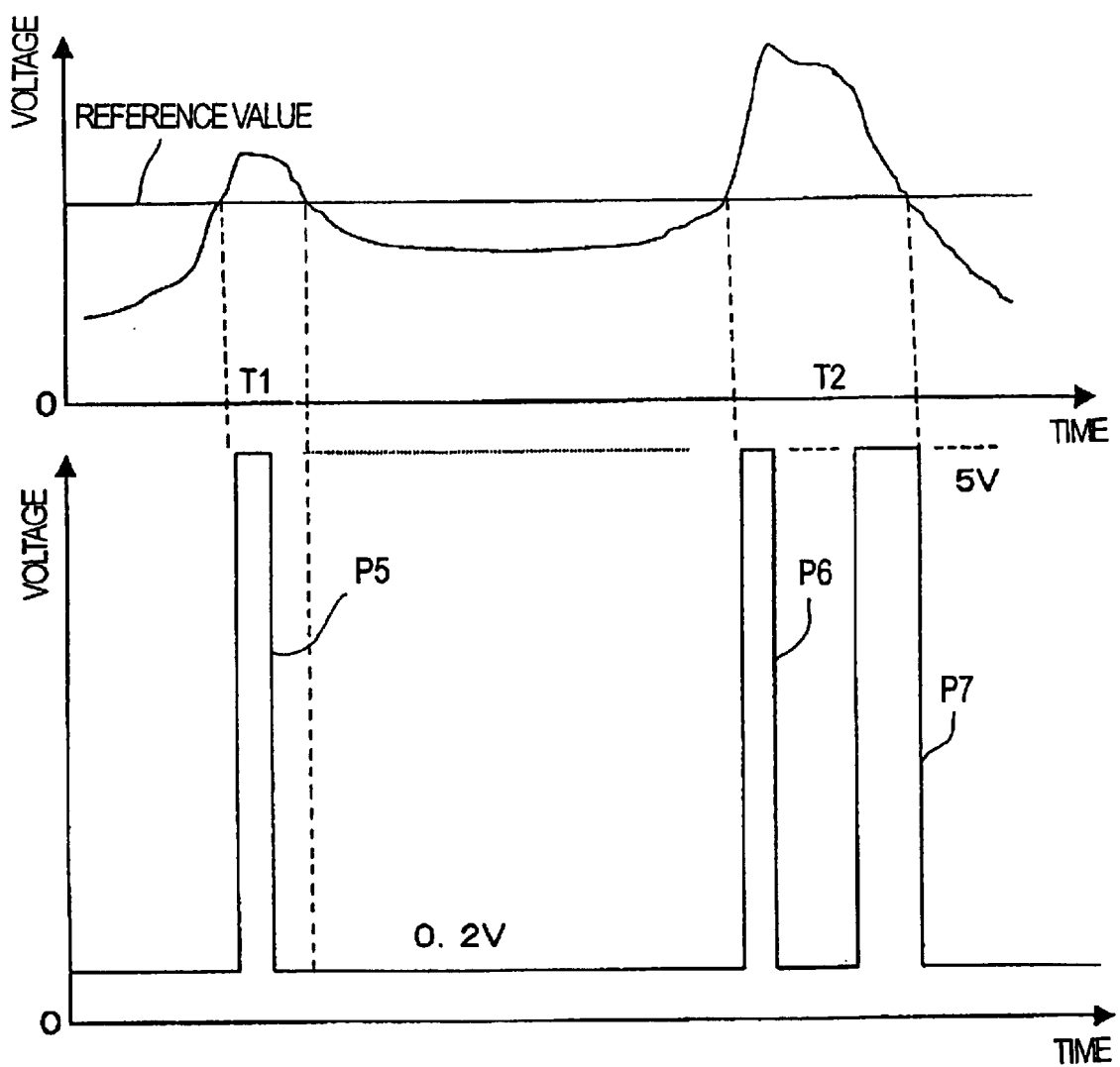
FIG. 7 is a timing diagram showing a relationship between the sled servo signal and the output voltages of the voltage generators in the optical disk drive shown in FIG. 5.
Figure 8A:
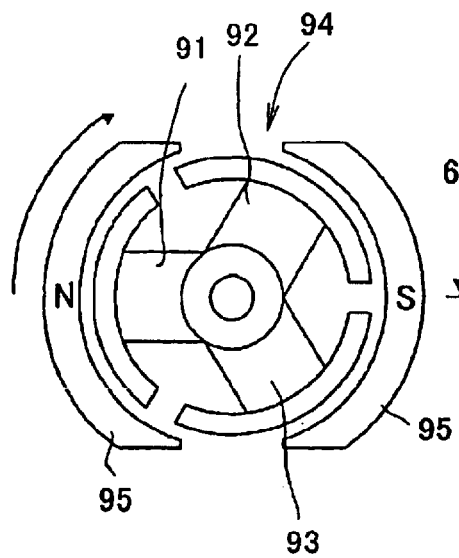
FIGS. 8A and 8B are schematic representations illustrating the structure of a DC motor.
Figure 8B:
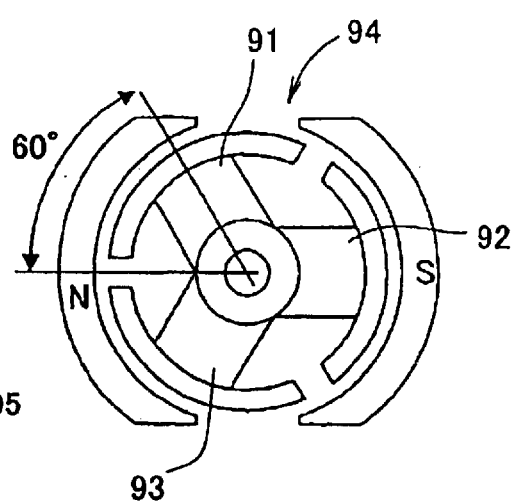
Figure 9:
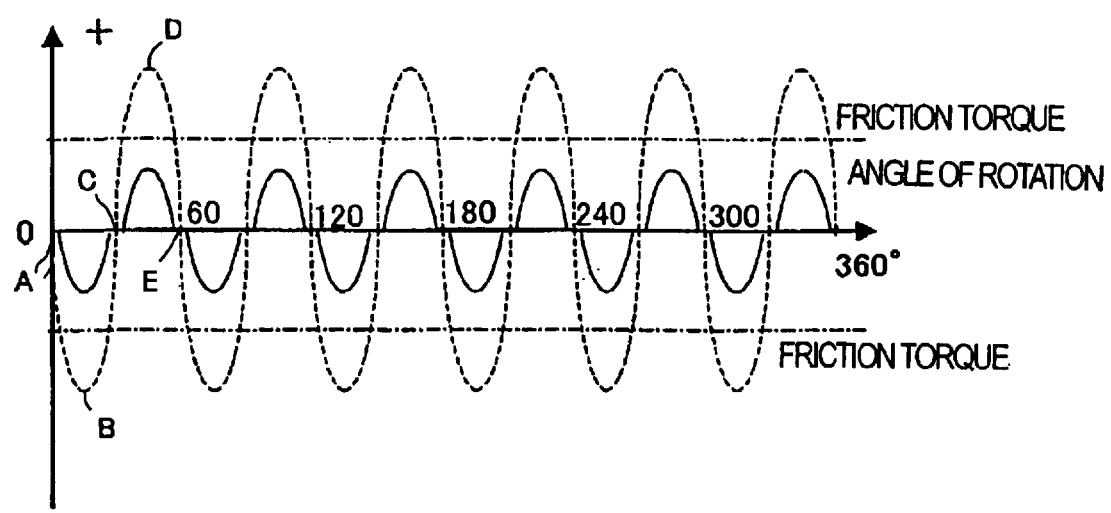
FIG. 9 is a graph showing a relationship between a cogging torque generated in a DC motor and the angle of rotation of the rotor.

FIG. 7 is a graph showing a relationship between the sled servo signal and the voltage applied to the DC motor 5. As shown in FIG. 7, the sled servo signal has a positive value, of which the absolute value is greater than the reference value, in interval T1. Thus, as described for the first preferred embodiment, a drive pulse voltage P5, having amplitude equal to that of the positive first voltage and a pulse width of 300 $\mu$s, is applied to the DC motor 5, thereby moving the optical head 23. As a result, the shift of the objective lens 28 from its home position falls within a predetermined range and the sled servo signal comes to have an absolute value smaller than the reference value.

In the next interval T2, the sled servo signal has a positive value having an absolute value that is far greater than the reference value. Accordingly, the absolute value of the sled servo signal cannot be decreased to less than the reference value just by applying a drive pulse voltage P6, having amplitude equal to that of the positive first voltage, to the DC motor 5 for 300 $\mu$s a single time and getting the optical head 23 moved. Thus, in that case, the timing changer 32 changes the timing signal interval proportionally to the absolute value of the sled servo signal in Step 69. Subsequently, after the sign of the sled servo signal is found positive in Step 62, another positive drive pulse voltage P7 is applied to the DC motor 5 in Step 63. The amplitude of the drive pulse voltage P7 is equal to that of the positive first voltage (i.e., the drive pulse voltage P6) but the pulse width thereof is proportional to the absolute value of the sled servo signal and is greater than that of the drive pulse voltage P6. Thus, by applying such a drive pulse voltage P7 to the DC motor 5, the optical head 23 can be moved for a longer distance compared to the situation where the drive pulse voltage P6 is applied to the DC motor 5. As a result, the objective lens 28 can be moved more quickly within a predetermined distance range as defined with respect to its home position.

In this manner, according to this preferred embodiment, if the optical head cannot be moved for a predetermined distance just by applying the first voltage to the DC motor a single time, then the first voltage of the same amplitude is applied to the DC motor again for a longer time, thereby moving the optical head for a longer distance. As a result, the optical head can be moved to the target position more quickly.

In the first and second preferred embodiments described above, the voltage generator circuit continuously applies direct current voltages as the first and second voltages for respectively predetermined amounts of time. Alternatively, the voltage generator circuit may include a pulse width modulator (PWM) for outputting the first and second voltages as effective pulse voltages by controlling a duty ratio of a pulse voltage.

Also, in the preferred embodiments described above, the negative and positive first voltages have mutually inverse polarities and the same absolute value and the negative and positive second voltages also have mutually inverse polarities and the same absolute value. However, the negative first and second voltages do not have to have the same absolute values as the positive first and second voltages, respectively. For example, the absolute value of the positive first voltage may be greater than that of the negative first voltage. That is to say, the movement of an object to be driven (e.g., the optical head 23) may be controlled by moving the object for mutually different distances in one and opposite directions.

Also, in the preferred embodiments described above, the second voltage is output continuously from the voltage generator circuit except the intervals in which the first voltage is output. However, if the optical disk drive is kept OFF for a predetermined amount of time or more, then the second voltage may be decreased or set to zero.

Furthermore, in the optical disk drive according to the preferred embodiments described above, the second voltage output from the voltage generator circuit 13 is predefined.

Optionally, every time the optical disk drive is powered, the optical disk drive may perform learning to define the second voltage in the following manner. First, after the optical disk drive has been powered, the control unit gets the first voltage applied to the DC motor, thereby moving the optical head 23. Next, either 0 V or a predetermined second voltage is applied to the DC motor to see whether or not the optical head 23 moves. Thereafter, the second voltage is increased gradually to find a second voltage value at which the optical head 23 no longer moves in the backward direction. The second voltage value found in this manner may be defined as the second voltage.

Furthermore, in the second preferred embodiment described above, the timing signal interval is changed with the absolute value of the sled servo signal. Alternatively, every time the timing signal is applied as pulse, the timing signal interval may also be simply increased by a predetermined amount of time.

Furthermore, in the first and second preferred embodiments, the present invention has been described as being applied to an optical disk drive. However, the present invention is also applicable to various other types of motor controllers including: a disk drive that uses a DC motor and performs read and/or write operations non-optically; and printer, photocopier, facsimile and robot that require highly accurate positioning control.

A motor controller according to various preferred embodiments of the present invention described above applies a first voltage, which is high enough for a driving mechanism to overcome a load applied to an object and drive the object, to a DC motor, thereby moving the object. Immediately after that, the motor controller applies a second voltage to the DC motor, thereby preventing the DC motor from rotating either in the backward direction due to its own cogging torque or in the forward direction. Accordingly, the first voltage may be applied to the DC motor for a sufficiently short time to drive the object. Thus, the present invention provides a motor controller that achieves high positioning accuracy and operates constantly.

In addition, in the motor controller according to the preferred embodiments of the present invention, the first voltage is three times or more as high as the minimum voltage that needs to be applied to the DC motor to start it. Accordingly, even if the object of control has not moved for the predetermined distance just by applying the first voltage to the DC motor a single time and if the frictional load has increased significantly, the frictional load applied to the object can be overcome and the object can be moved to the target position by applying the same first voltage to the DC motor again. Thus, the present invention provides a motor controller that can perform a stabilized control operation without causing any failure of control.

Furthermore, in the motor controller according to the preferred embodiments of the present invention described above, when the same first voltage is applied again to the DC motor, that first voltage is applied for a longer time to move the object of control for a longer distance. Thus, the motor controller can move the object for the predetermined distance more quickly by applying the first voltage of the same amplitude to the DC motor again.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A motor controller comprising:

a DC motor which generates a cogging torque;

a driving mechanism for moving an object having a predetermined mass against a load applied to the object and by transmitting a rotational force of the DC motor to the object;

voltage generating means, electrically connected to the DC motor, for generating first and second voltages, the first voltage having amplitude high enough to rotate the DC motor to such a degree as to get the object moved by the driving mechanism, the second voltage having the same polarity as the first voltage and having such amplitude as to prevent the DC motor from rotating either in a backward direction due to the cogging torque or in a forward direction; and control means for controlling the voltage generating means in such a manner that the voltage generating means applies the second voltage to the DC motor under the state that the cogging torque is generated, after having applied the first voltage to the DC motor.

2. The motor controller of claim 1, wherein the control means gets a pulse voltage applied as the first voltage to the DC motor, a pulse width T of the pulse voltage satisfying $t \leq T \leq 5t$, where t is an electrical time constant of the DC motor.

3. The motor controller of claim 1, wherein the first voltage is three times or more as high as a minimum voltage that needs to be applied to the DC motor for the driving mechanism to overcome the load and move the object.

4. The motor controller of claim 1, wherein the voltage generating means generates the first and second voltages that are both positive or both negative, and wherein the control means controls the voltage generating means in such a manner that the voltage generating means selectively applies the positive first and second voltages or the negative first and second voltages to the DC motor, the first and second voltages changing their polarity from positive into negative, or vice versa, depending on a direction in which the object should be moved.

5. The motor controller of claim 1, wherein the control means controls the voltage generating means in such a manner that the voltage generating means alternately applies the first and second voltages to the DC motor.

6. The motor controller of claim 1, wherein the voltage generating means comprises a pulse width modulator and generates the first and second voltages as effective pulse voltages to be output from the pulse width modulator.

7. The motor controller of claim 1, wherein if the object is not driven for a predetermined amount of time or more, the amplitude of the second voltage is decreased.

8. The motor controller of claim 1, wherein the voltage generating means comprises switching means and generates the first voltage by turning the switching means ON.

9. A method of driving a DC motor for the purpose of transmitting a rotational force of the DC motor to an object, having a predetermined mass, by way of a driving mechanism, the driving mechanism being coupled to the DC motor and moving the object against a load applied to the object, the DC motor generating a cogging torque, the method comprising the steps of:

generating first and second voltages, the first voltage having amplitude high enough to rotate the DC motor, the second voltage having the same polarity as the first voltage and having such amplitude as to prevent the DC motor from rotating either in a backward direction due to the cogging torque or in a forward direction;

applying the first voltage to the DC motor; and then applying the second voltage to the DC motor under the state that the cogging a torque is generated.

10. The method of claim 9, wherein the step (b) comprises the step of applying a pulse voltage as the first voltage to the DC motor, a pulse width T of the pulse voltage satisfying t≦T≦5t, where t is an electrical time constant of the DC motor.

11. The method claim 9, wherein the step (b) comprises the step of applying the first voltage, which is three times or more as high as a minimum voltage that needs to be applied to the DC motor for the driving mechanism to overcome the load and move the object, to the DC motor.

12. The method of claim 9, further comprising the step of alternately applying the first and second voltages to the DC motor.

13. A motor controller comprising:

a DC motor;

a driving mechanism for moving an object having a predetermined mass against a load applied to the object and by transmitting a rotational force of the DC motor to the object;

voltage generating means for generating first and second voltages, the first voltage having amplitude high enough to rotate the DC motor to such a degree as to get the object moved by the driving mechanism, the second voltage having the same polarity as the first voltage and having such amplitude as to prevent the DC motor from rotating either in a backward direction due to a cogging torque or in a forward direction; and control means for controlling the voltage generating means in such a manner that the voltage generating means applies the second voltage to the DC motor after having applied the first voltage to the DC motor, wherein the control means sets a pulse voltage applied as the first voltage to the DC motor, a pulse width T of the pulse voltage satisfying t≦T≦5t, where t is an electrical time constant of the DC motor, wherein the control means senses the magnitude of movement of the object, and wherein if the control means senses that the object has moved to less than a predetermined value, the control means gets the first and second voltages repeatedly applied from the voltage generating means to the DC motor.

14. The motor controller of claim 13, wherein the control means senses the magnitude of movement of the object, and wherein if the control means senses that the object has moved to less than the predetermined value, the control means gets the pulse width T of the pulse voltage increased.

* * * * *

UNITED STATES PATENT AND TRADEMARK OFFICE
CERTIFICATE OF CORRECTION

PATENT NO.     : 6,759,824 B2
DATED          : July 6, 2004
INVENTOR(S)    : Toru Kawabata et al.

It is certified that error appears in the above-identified patent and that said Letters Patent is hereby corrected as shown below:

<u>Column 25,</u>
Line 11, please insert the word -- of -- so the claim reads -- The method of claim 9 --

Signed and Sealed this

Twenty-second Day of March, 2005

JON W. DUDAS
*Director of the United States Patent and Trademark Office*